United States Patent [19]

Berto

[11] Patent Number: 5,529,544
[45] Date of Patent: Jun. 25, 1996

[54] DRIVE CLUTCH WITH MULTI-STAGED DISPLACEMENT RATE AND A METHOD FOR CONTROLLING A DRIVE CLUTCH

[76] Inventor: Joseph J. Berto, 6539 Rogue River Dr., Shady Cove, Oreg. 97539

[21] Appl. No.: 504,108

[22] Filed: Jul. 19, 1995

Related U.S. Application Data

[63] Continuation-in-part of Ser. No. 294,043, Aug. 24, 1994, Pat. No. 5,460,595.

[51] Int. Cl.⁶ .................................................. F16H 59/00
[52] U.S. Cl. ............................................................ 474/11
[58] Field of Search .................................. 474/11–13, 46, 474/69, 70

[56] References Cited

U.S. PATENT DOCUMENTS

| | | |
|---|---|---|
| 824,022 | 6/1906 | James . |
| 1,501,705 | 7/1924 | Decoux . |
| 2,326,468 | 8/1943 | Koch . |
| 2,611,277 | 9/1952 | Mitchell . |
| 3,015,237 | 1/1962 | Musgrave . |
| 3,180,164 | 4/1965 | Chung . |
| 3,362,242 | 1/1968 | Watkins . |
| 3,383,934 | 5/1968 | Flynn . |
| 3,628,389 | 12/1971 | Wiegelmann et al. . |
| 3,698,256 | 10/1972 | Albertson . |
| 3,709,052 | 1/1973 | Lassanske . |
| 3,824,867 | 7/1974 | Brooks . |
| 3,875,814 | 4/1975 | Steuer . |
| 3,939,720 | 2/1976 | Aaen et al. . |
| 3,958,461 | 5/1976 | Aaen et al. . |
| 3,967,509 | 7/1976 | Teal . |
| 3,975,964 | 8/1976 | Adams . |
| 4,149,425 | 4/1979 | Williams . |
| 4,483,686 | 11/1984 | Kobayashi et al. ................. 474/11 |
| 4,571,216 | 2/1986 | Stieg et al. . |
| 4,919,643 | 4/1990 | Fuss et al. . |
| 5,460,575 | 10/1995 | Berto ................................. 474/11 |

OTHER PUBLICATIONS

Aaen Performance™, "The Power Factory," '91 Snow Catalog, Kenosha, WI 53140.
Bender Racing, "Snowmobile Clutch Reference Guide," Colden, N.Y. 14033.
Olav Aaen's "Clutch Tuning Handbook," Kenosha, WI 53140 (1993).
Polaris Master Repair Manual, Section VII, "Torque–O–Matic Drive," pp. VII–1–VII–27, Roseau, Minnesota (1991).

*Primary Examiner*—Michael Powell Buiz
*Attorney, Agent, or Firm*—Burns, Doane, Swecker & Mathis

[57] ABSTRACT

A drive clutch assembly having a fixed sheave and a moveable sheave rotatable with the drive shaft of an engine comprising a multi-staged speed responsive or displacement system. The speed responsive system initially applies a first displacement rate to the moveable sheave as it moves toward the fixed sheave and applies a second displacement rate to the moveable sheave when the drive clutch assembly reaches a predetermined rotational speed.

19 Claims, 13 Drawing Sheets

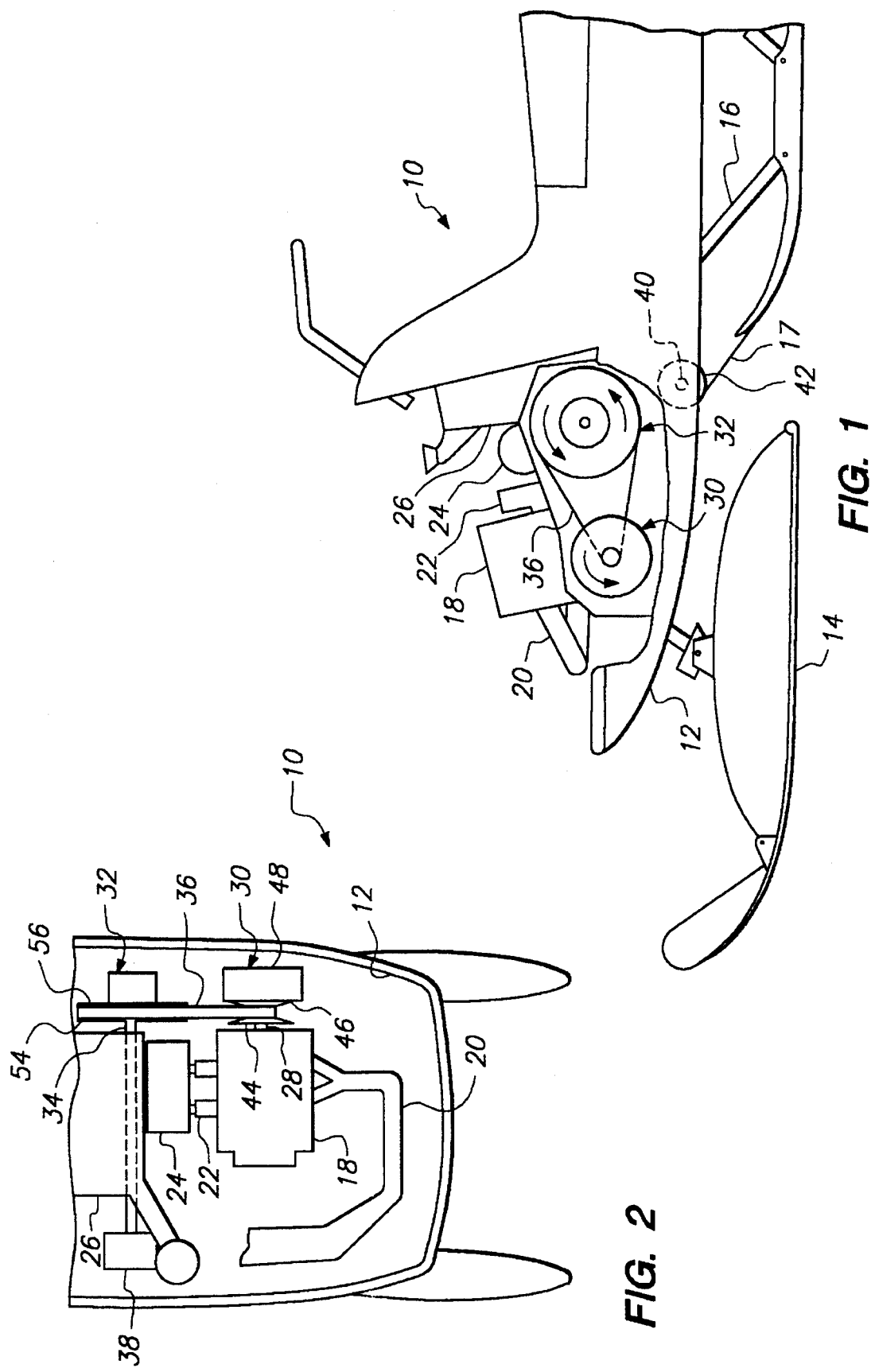

DRIVE CLUTCH WITH MULTI-STAGED DISPLACEMENT RATE AND A METHOD FOR CONTROLLING A DRIVE CLUTCH

CROSS-REFERENCE TO RELATED APPLICATION

This application is a continuation-in-part of U.S. patent application Ser. No. 08/294,043, filed Aug. 24, 1994, now U.S. Pat. No. 5,460,575 issued Oct. 24, 1995.

FIELD OF THE INVENTION

The present invention relates to variable speed belt transmissions often used in snowmobiles, golf carts, off-road recreational vehicles, etc. More particularly, the invention relates to a drive clutch with a multi-staged speed responsive or displacement means and variable displacement rate.

BACKGROUND OF THE INVENTION

A great many vehicles, such as snowmobiles, have a variable speed belt transmission driving system (sometimes referred to as torque converters). In such a system, there is a drive or driving clutch with a moveable conical faced sheave and a fixed conical faced sheave, a driven clutch with a moveable conical faced sheave and a fixed conical faced sheave, a transmission belt extending between each pair of sheaves coupling the driving and driven clutches, a speed responsive or displacement means (hereinafter referred to as "speed responsive means" but that term also represents "displacement means" and the two terms can be interchanged) such as a plurality of like cams, flyweights or other means which are operatively associated with the moveable sheave of the driving clutch and a biasing or resistance means in the driving and driven clutch to oppose the displacement of the moveable sheave by the speed responsive means.

The purpose of the driving clutch is to control the speed of the engine in all gear ratios as the transmission changes gears. There is a biasing or resistance means in the driving clutch that works against the speed responsive means associated with the moveable sheave. The biasing means and speed responsive means are matched to assure a reasonable initial engagement speed to assure that the vehicle will have enough power to move. The drive clutch is the primary mechanism to determine the upshift of the clutch system and as such should be used to determine engine rpm. The driving clutch can be adjusted to achieve a predetermined or desired engine speed by modifying the biasing or resistance means (see commonly owned co-pending application, U.S. patent application Ser. No. 08/294,043 filed Aug. 24, 1994, now U.S. Pat. No. 5,460,575 issued Oct. 24, 1995, which is incorporated herein by reference in its entirety to which this application is a continuation-in-part continuing application) or, by modifying the speed responsive means in accordance with the present invention.

The purpose of the driven clutch is to control the backshift and to provide enough side pressure on the transmission belt to allow power to be transmitted from the driving clutch to the driven clutch without the belt slipping. The side pressure on the belt has a lot to do with power loss and backshifting. The higher the belt pressure, the quicker the backshifting but the higher the power loss, also. Therefore, conventionally the driven clutch biasing means is selected to be a compromise between quick backshifting and low power loss. High belt side pressure also results in increased belt wear and shorter belt life.

In operation at low rotational speeds of the driving clutch, the fixed and moveable sheaves of the driving clutch are forced apart by a biasing or resistance means (e.g., compression spring) parallel to the centerline of a drive shaft running between the fixed and axially moveable sheaves, thus enabling the transmission belt to ride near the bottom of the driving clutch thereby creating a small diameter drive wheel. Correspondingly, the sheaves of the driven clutch are forced close together by a biasing means parallel to the centerline of a drive shaft running between the fixed and moveable sheaves, thus causing the transmission belt to operate near the outer edge of the conical faces of the driven clutch sheaves thereby creating a large diameter driven wheel. Therefore, at low speeds a small diameter drive wheel clutch is coupled by the transmission belt to a large diameter driven wheel. This is, in effect, a low gear since it requires many turns of the drive wheel to cause one rotation of the driven wheel.

As the rotational speed of the driving clutch increases in response to increased engine speed, speed responsive means (i.e., cams or flyweights) operatively associated with the moveable sheave of the driving clutch, and opposed by the biasing or resistance means located on or parallel to the centerline of the driving clutch as well as side pressure on the transmission belt caused by the biasing means in the driven clutch, force the moveable sheave of the driving clutch closer to the fixed sheave thereby causing the transmission belt to move outward on the conical radius of the drive wheel so as to operate at a greater distance from the center of the driving clutch. The forces on the transmission belt which cause it to move upward along the conical radius of the drive wheel also cause it to move inwardly against the side pressure along the radius of the driven wheel thus forcing the moveable sheave of the driven clutch away from its associated fixed sheave. These sheaves are spread apart in relation to the driven helix and spring in the driven clutch. The steeper the angle on the helix, the faster the sheaves will spread. The spring counteracts this force to keep the sheaves from shifting too fast, as well as providing a back shift force when the engine speed is reduced.

Thus higher rotational speeds of the driving clutch cause the transmission belt to effectively form a large diameter drive wheel and a small diameter driven wheel. This is, essentially, a high gear since it enables one complete rotation of the drive wheel to cause several complete rotations of the driven wheel. This means that such a transmission belt drive system has a built-in capability of effectively switching from a low gear to a higher gear as the rotational speed of the drive wheel is increased.

However, there are some inherent disadvantages to this type of system in which the gear ratio is automatically changed with an increase or decrease in rotational speed of the drive clutch. These disadvantages exist because the gear ratio change can occur at a time when constant speed is desired, such as when travelling down a road or trail, or the gear ratio can remain fixed at a time when it should be changing in response to an increased load, like a hill or a turn.

Consider, for example, a snowmobile which utilizes the transmission belt drive system. Normally, a low gear is needed to get the machine moving but after it has commenced moving and the throttle is advanced, the gear ratio begins to change in order to place the vehicle in a higher gear. This is normal operation and no problem occurs.

When it is desired to travel at a constant speed the transmission will operate in a higher gear ratio than is needed if the clutch has been tuned to operate at the top of the power band thereby forcing the operator to drive in a higher gear than is necessary for the given conditions. This results in excessive power output and thus poor fuel economy.

Further, assume it is desired to climb a hill or in some other manner the load placed upon the vehicle is increased. If the vehicle is travelling at a high rate of speed the driving clutch rotational speed is high and the machine is in a high gear ratio. However, when a vehicle is attempting to climb a hill or move a heavy load under increasing load conditions, it needs a lower gear ratio, therefore such a higher gear ratio is an undesirable situation. That is, at this time greater torque is needed at the driven wheel, not greater speed. In order to achieve greater torque, the transmission must backshift. Failure to do so results in power fuel efficiency and undesirable air pollution.

Therefore, a particular disadvantage of this type of known system is that the vehicle is slow to backshift, (i.e., downshift) in response to this need for greater torque. The reason being that the speed responsive means (i.e., flyweights) that push the sheaves of the driving clutch together against the compression spring in the driving clutch and the compression spring that initially pushes the sheaves of the driven clutch together is a fixed combination that is selected to compromise between a combination that upshifts quickly and a combination that downshifts quickly. If the flyweights (i.e., speed responsive means) are light, the transmission will upshift slowly but downshift quickly. If the flyweights are heavy, the transmission will upshift quickly but downshift slowly.

There is a long-felt need for a device which will overcome these problems and allow the driving system to upshift quickly when low drag is encountered and downshift quickly when more torque is needed in addition to allowing the engine to be operated at either its most fuel efficient speed setting or its most powerful speed setting.

Prior Art

It is commonly accepted to use single rate displacement means (i.e., each element in the displacement means is the same and act together) in the drive clutch, as shown in U.S. Pat. No. 3,362,242 to Watkins and U.S. Pat. No. 3,709,052 to Lassanske.

This is a simple means to offset the force supplied by the biasing means but the disadvantage to this approach is that the linear force provided by the single rate displacement means does not take into account the parasite drag of the vehicle or the varying terrain that the vehicle might encounter. Parasite drag is the drag on the vehicle caused by wind resistance, sliding resistance, etc. The parasite drag on a vehicle increases non-linearly as the speed of the vehicle increases. Take for example, when a snowmobile is moving at a relatively low speed, say 40 miles per hour, it requires approximately 25 horsepower. But when the snowmobile is moving twice as fast (i.e., 80 miles per hour), it requires approximately 90 horsepower. It would be desirable to have a displacement means that had a two stage (or more) displacement rate so that as the belt rises up on the drive wheel, the moveable sheave would be slowed in its movement by a second displacement rate exerted on the moveable sheave so that more torque would be delivered at the driven wheel to compensate for the parasite drag. On the other hand, when drag is low the engine speed (rpm) should be low so as to maximize efficiency while still optimizing the gear ratio of the shift-out period.

In addition, two-stroke engines that commonly use such transmission belt driving systems operate more efficiently when operated within the power band discussed below. Therefore, it is also desirable to have a system that allows the engine to operate within this band (i.e., operate at a relatively constant speed), while allowing the output of the system at the driven clutch to vary so as to match the needs of either greater torque or increased speed, as discussed above.

U.S. Pat. Nos. 3,939,720 and 3,958,461, both issued to Aaen et al., disclose using a pair of speed responsive means consisting of eccentrically supported fly weights. However, both of the Aaen et al. patents are directed to a drive clutch with a selectively operable control means that allows the drive clutch to be set to only one of three conditions: neutral; trail (i.e., cruise) condition; or performance condition. In the neutral condition, neither sets of flyweights can operate. In the trail condition, both flyweights operate together continuously throughout the full movement of the moveable sheave. In the performance condition, only one set of flyweights can operate throughout the full movement of the moveable sheave. The drive clutch of Aaen et al. can not be set to operate in both the trail and performance conditions, nor does the drive clutch of Aaen et al. change automatically from a trail condition to a performance condition.

The art of "tuning" a clutch has been practiced for many years. Though the components are nearly the same for all applications, they are individually tailored for each situation. There is typically a combination that leads to good upshifts, reasonable backshifts, and acceptable efficiencies and wear for any given set of conditions. This is the current state of the art, particularly for snowmobiles, and although there is tuning for specific powerbands and applications, there is a very small window of performance to be improved upon.

One of the areas that has been looked at for improving performance is the range from initial upshift up through the 2:1 ratio of the transmission. This is typically the area that conventional clutches are inefficient and the area where parasite drag is low. Upshift patterns are usually optimized for the 1:1 ratio so that when more torque is needed, the engine is operating in the best part of its powerband. To do this with conventional clutches, requires that the shift patterns be confined to a very narrow part of the powerband. Some driven clutch helix have been cut to multiple angles. This allows the transmission to upshift quickly after engagement without pulling the engine out of its powerband. The advantages of the multi-angle helix are somewhat offset by the decreased backshifting capabilities and the complex tuning involved with their use. Tuning the upshift of the drive clutch by using the driven clutch is counter-productive and hurts the primary purpose of the driven clutch, which is a torque sensing unit, which is backshifting. At the 3:1 to 2:1 ratios of the transmission, the driven clutch is tinder its highest torque load and the increased friction of the steeper helix at this point leads to poor efficiency and poor backshifting.

There is a long felt need and desire to find a way to tune the clutches to take advantage of low parasite drag by keeping the driven clutch at its optimum settings for backshifting and efficiency (i.e., side pressures and spring tensions) while tuning the drive clutch for a quicker upshift during the 3:1 to 2:1 period.

SUMMARY OF THE INVENTION

The present invention fulfills the desires discussed above by providing a multiple stage speed responsive means for a driving clutch that maximizes the fuel efficiency of the engine when parasite drag is low and enhances the upshift and backshift capabilities of the transmission system. The present invention is a novel combination of speed responsive or displacement means used to provide multi-staged displacement of the moveable sheave of a driving clutch so that the moveable sheave encounters a relatively decreased displacement rate from the flyweights as the parasite drag of the vehicle increases. In this way, the moveable sheave is slowed in its axial movement by the relatively decreased displacement rate so that more torque will be delivered at the driven wheel to compensate for the parasite drag and so that the engine does not over shift its power band by limiting the total mass of the displacement means when the parasite drag increases. The combination is also used to provide quicker, smoother shifting of the vehicle without compromising the action of the driven clutch.

The present invention allows the transmission to be set up in the conventional manner for optimum performance in the 1.5:1 to 0.75:1 ratio period where the maximum power is needed. In addition, the present invention increases upshifting through the 3:1 ratio period where the transmission is inefficient. Furthermore, the present invention operates in the 2:1 to 1.5:1 ratio period as much as possible as this is the more efficient part of the engine powerband.

It is an object of the present invention to maximize the efficiency and performance of continuously variable belt transmissions. This object is achieved by assuring that the vehicle engine is operated in the most efficient part of its power curve by utilizing the full width of the power band of the engine. This object is further achieved by operating the continuously variable transmission in the 2:1 to 1:1 ratio area as much as possible.

It is another object of the present invention to improve significantly the fuel efficiency of such vehicles and to reduce engine noise and vibration using the infinitely variable "gear ratio" between the drive and driven clutches of such a transmission. It is a further object of the present invention to "tune" the transmission so that the engine turns at a predetermined speed when the vehicle is at a constant throttle setting, as when cruising down a road, so that maximum fuel economy and minimum noise levels are obtained. In particular, using the full power band of the engine with the lower part being used for fuel efficiency and the upper part being used for performance (high speed).

It is also an object of the present invention to improve the up-shifting and back-shifting of the transmission in response to both engine speed and vehicle speed. It has long been known that up-shifting, as the vehicle drive belt or wheels increase speed, is readily controlled by progressively increasing engine speed as the vehicle accelerates. However, when the vehicle speed decreases under an increasing load, as in hilly terrain where it is necessary to brake the vehicle for a sharp turn followed immediately by a long steep incline, it is essential for the transmission to respond by promptly down shifting to deliver enough torque to match the vehicle load.

As particularly contrasted to the conventional use of a single flyweight system (i.e., each of the flyweights act continuously together) the displacement rate of two (or more) speed responsive means (i.e., a flyweight system comprising two or more sets of flyweights) or a single compound speed responsive means can counter-balance the axial force generated by the pressure spring and belt forces of the drive clutch in a more suitable manner than is possible with a conventional single flyweight system. I have discovered that two (or more) speed responsive means engaged in concert initially, but then engaged with a fixed stop so as to limit the movement of one of the speed responsive means without interfering with the movement of the other speed responsive means can be used. The net unexpected result is that the lower part of the power band of the engine can be used for fuel efficiency at normal cruising speeds and the upper part of the power band (i.e., the peak power) can be used for performance speeds.

In accordance with a preferred embodiment of the invention, a vehicle is propelled by an engine having a drive shaft directly connected to a drive clutch assembly through a center column or shaft. The center column or shaft includes an axially fixed sheave end and a drive shaft attaching end. A fixed sheave is attached adjacent one end of the center column or shaft for common rotation therewith, and an axially moveable sheave is arranged to move axially along the center column or shaft. The axially moveable sheave moves between a retracted position initially spaced from the fixed sheave and is actuated by a speed responsive or displacement means for displacing the moveable sheave toward the fixed sheave in accordance with an increase in the speed of the drive shaft. The speed responsive or displacement means displaces the moveable sheave in an amount and to an extent to control the load transferred to a driven clutch by the axially moveable sheave and the fixed sheave of the drive clutch through an endless belt. A biasing or resistance means initially urges the moveable sheave toward the retracted position.

To achieve improved fuel efficiency and shifting, the speed responsive means or displacement means in one embodiment comprises two sets of flyweights having different size, shape and/or weights. Typically, the first set (i.e., primary set) is heavier than the second set (i.e., secondary set), although it does not have to be. A set screw is mounted in front of each of the lighter weights of the second set of flyweights. Each of the set screws are adjusted such that initially the two sets of flyweights operate simultaneously by exerting an initial displacement rate against the moveable sheave. Then at a preselected rotational speed of the drive clutch or predetermined position of the second set of flyweights, the flyweights of the second set (e.g., lighter set of flyweights) contact the set screws and are prevented from exerting force on or further displacing the moveable sheave, but without interfering with further movement of the first set of flyweights. Therefore, for rotational speeds greater than the preselected rotational speed, the first set of flyweights (e.g., heavier set) acts alone in displacing the moveable sheave. In this way, the speed responsive or displacement means initially applies a first displacement rate to move the moveable sheave toward the fixed sheave and a second displacement rate to the moveable sheave when the drive clutch reaches a predetermined rotational speed or the second set of flyweights reach a predetermined position.

The first displacement rate, consisting of the force exerted by both the primary and secondary weights together, is relatively greater than the second displacement rate, which consists of the force exerted by the primary weights alone. In this way, the transmission upshifts relatively quickly through the inefficient 3:1 ratio period because of the greater first displacement rate. Then, when the transmission reaches the more efficient 2:1 to 1.5:1 ratio period, the secondary weights are stopped from exerting force so that the upshift of the transmission is slowed down in this range. With the present invention, the drive clutch is optimized for upshifting which is its primary function and the driven clutch is set-up in the conventional manner with a low angle helix and light belt side pressure so that it operates fuel efficiently and effectively in backshifting which is its primary function.

The same operation can be accomplished with two (or more) sets of weights that are all the same size, shape and/or weight by mounting the secondary set of weights closer to the center shaft of the driving clutch so that their center of gravity has a shorter radius than the primary weights. In addition, the same can be accomplished with two (or more) sets of weights that are all the same size, shape and/or weight by mounting the secondary set of weights with their center of gravity closer to a line through the pivot point of the weights (i.e., tucking the center of gravity under the pivot point more for the secondary weights than for the primary weights).

In one of its method aspects, the present invention provides a method for controlling a drive clutch of the type previously described, the method comprising the following steps. Applying a first displacement rate with the speed responsive or displacement means as the moveable sheave moves toward the fixed sheave. Applying a second displacement rate with the speed responsive or displacement means automatically when the drive clutch reaches a predetermined rotational speed.

BRIEF DESCRIPTION OF THE DRAWING

The invention will now be described with reference to the accompanying drawing, in which:

FIG. 1 is a partial left side elevation view of a snowmobile showing a portion of a continuously variable transmission belt driving system;

FIG. 2 is a top plan view of a portion of the snowmobile drive system shown in FIG. 1;

DETAILED DESCRIPTION OF THE INVENTION

The discussion of the present invention is with reference to a snowmobile, but it is well recognized in the art that continuously variable transmission belt driving systems (i.e., torque converters) are used in many different vehicles such as golf carts, go-karts, all terrain vehicles, riding lawn mowers, electric-powered cars, etc., as well as on many different types of machines used in the manufacturing and service industries.

Figure 14:
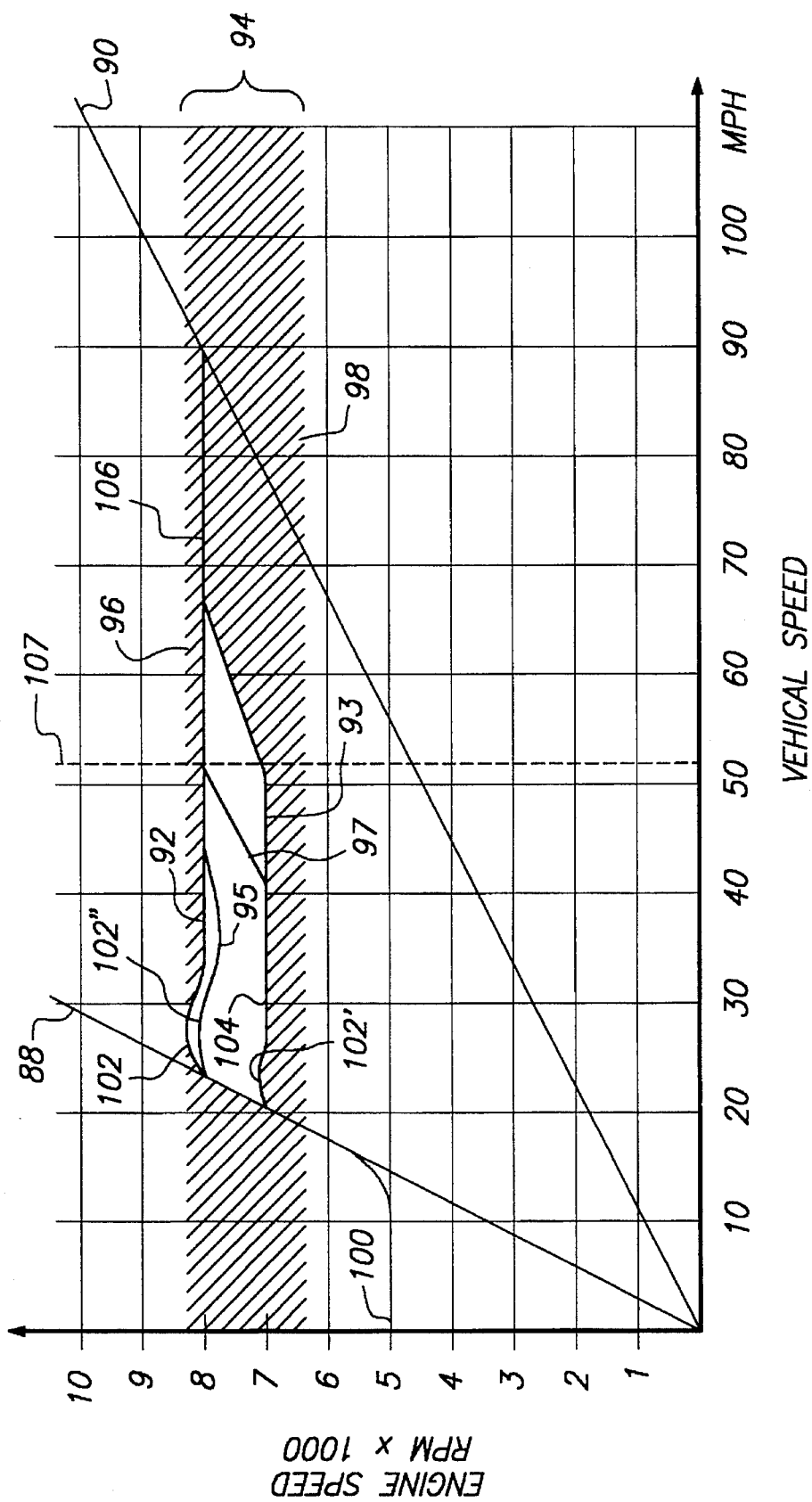
FIG. 14 is a vehicle speed vs. engine speed diagram.

Two-stroke engines that commonly use variable speed transmission belt driving systems operate more efficiently when operated in a power band 94 shown in the speed diagram in FIG. 14. See Olav Aaen, "Clutch Tuning Handbook," Kenosha, Wis. (1993). The speed diagram has the engine speed (rpm) on the vertical axis and the vehicle speed (mph) on the horizontal axis. Line 88 represents the low gear ratio of a typical variable speed transmission. The low gear ratio occurs where the transmission belt is near the bottom of the sheaves of the driving clutch and near the outer edges of the sheaves of the driven clutch. Typically, the low gear ratio is 3:1, whereby the driven clutch rotates one time for every three rotations of the driving clutch. In the 3:1 gear ratio period, the transmission is generally inefficient.

Line 90 represents the high gear ratio of the transmission. The high gear ratio occurs where the belt is near the outer edges of the driving clutch and near the bottom of the sheaves of the driven clutch. Typically, the high gear ratio in overdrive is 0.75:1, whereby the driven clutch rotates one time for every ¾ of a rotation of the driving clutch.

Line 92 is a typical shift curve of a two-stroke engine with a power peak at 8250 rpm. The power band 94 is shown by the shaded area. The power band 94 represents a range of engine speeds in which the engine is delivering optimum power. The top 96 of the power band 94 is the power peak of the engine. Operating the engine at its power peak is ideal for performance (high speed) riding. The bottom 98 of the power band 94 is ideal for fuel efficiency because the engine is not creating more horsepower than is needed to move the vehicle at normal cruise speeds.

Two points on the speed diagram that are of particular importance are the engagement speed 100 and the shift-out speed 102. The engagement speed 100 is the engine speed (rpm) required to start the vehicle moving. At the engagement speed 100, the speed responsive or displacement means in the driving clutch overcomes the pretension of the biasing or resistance means in the driving clutch and starts moving the moveable sheave toward the fixed sheave until enough force is exerted on the belt to start the vehicle moving. After the driving sheaves have gripped the belt without slipping the vehicle will accelerate along the low ratio line 88. While the vehicle speed is increasing in the low gear ratio, the belt remains at the bottom of the driving sheaves.

The second important point occurs when the engine speed has built up enough centrifugal force in the speed responsive or displacement means to overcome both the pressure of the biasing or resistance means in the driving clutch and the side pressure on the belt by the biasing means in the driven clutch, the belt will move out on the driving sheaves, move in on the sheaves of the driven clutch, and the ratio of the transmission will change (i.e., shift up). This is the shift-out speed 102 and should be within the power band 94.

Typically, the shift curve 92 is in the power band 94 of the engine and is essentially straight from the shift-out speed 102 to the high ratio line 90. This means the engine speed is held constant in the area where the engine is delivering optimum power while the transmission ratio is changing (i.e., the transmission is up-shifting) and thus the vehicle speed is increasing.

As noted before, one of the purposes of the driven clutch is to provide enough side pressure on the belt to allow power to be transmitted to the ground to move the vehicle. However, too much side pressure results in reduced belt life, power loss, and decreased efficiency. In operation, more side pressure is needed in low ratio (about twice as much) than is needed in high ratio therefore typical driven clutches have a torsion spring and torque feed back ramp design that produces such a desired effect in the belt side pressure.

An object of the present invention is to match the speed responsive or displacement means of the driving clutch to the biasing or resistance means of the driving clutch along with the belt pressure created by the driven clutch in a first stage so that the engine speed is held at or near bottom 98 of the power band 94 for maximum engine efficiency (i.e., fuel efficiency), reduced noise and reduced vibration from the low ratio line 88 to predetermined speed 107. This region is generally the 2:1 to 1.5:1 ratio period. Predetermined speed 107 is selected to correspond with a maximum normal cruise speed. At speed 107, it is an object of the present invention to match the speed responsive means of the driving clutch to the biasing or resistance means of the driving clutch along with the belt pressure created by the driven clutch in a second stage so that the engine speed is held at or near top 96 of power band 94 for performance speeds from speed 107 to high ratio line 90. This region is generally the 1.5:1 to 0.75:1 ratio period.

Referring now to FIGS. 1 and 2, therein is shown a snowmobile indicated in its entirety by the reference numeral 10. Snowmobile 10 includes a longitudinally extending frame or body 12 partially supported on a pair of forwardly located skis 14 and on a rearwardly located drive track assembly including a suspension member 16 and an endless drive track 17. An engine compartment, normally covered by a hood (not shown) is located at the forward end of snowmobile 10 and contains an internal combustion engine 18 to the forward and rearward sides of which are respectively connected an exhaust pipe 20 and a carburetor 22. Located just behind and coupled to the carburetor 22 is an intake silencer 24 and just behind the intake silencer 24 is a fuel tank 26.

A continuously variable transmission belt driving system is connected between a horizontal drive shaft 28, projecting from the left side of engine 18, and drive track 17. The transmission system includes a driving clutch (i.e., drive clutch), shown generally at 30, mounted on engine drive shaft 28 and a driven clutch, shown generally at 32, mounted on a driven shaft 34 rotatably mounted on snowmobile frame 12 so that it is parallel with drive shaft 28. Endless drive belt 36 connects driving clutch 30 to the driven clutch 32. Located at the right side of the snowmobile is a chain case which houses a chain drive (not shown) which may be of any known type to one of ordinary skill in the art. The input to the chain drive is driven shaft 34 while the output of the chain drive is a cross shaft 40 on which is mounted a pair of drive sprockets 42 (only one shown) that are drivingly engaged with drive track 17.

Driving clutch 30 is mounted so that a fixed sheave 44 of driving clutch 30 is inboard of an axially moveable sheave 46 of driving clutch 30 having a housing 48 secured thereto for movement therewith and enclosing a speed responsive or displacement mechanism for shifting axially moveable sheave 46 toward fixed sheave 44 of driving clutch 30 in increasing amounts in response to increasing rotational speed of drive shaft 28.

The operation of the snowmobile transmission belt driving system is as follows. When engine 18 (FIG. 2) of snowmobile 10 is idling, drive shaft 28 rotates at a speed insufficient to activate speed responsive means 39 and 38 (FIG. 3) of driving clutch 30 and sheaves 44 and 46 are held fully apart by the compressive resistance of the biasing or resistance means 60 (FIG. 4) of the driving clutch 30 such that belt 36 rides loosely at radially inner portions of the opposed conical faces of sheaves 44 and 46. With belt 36 loose, no force is transferred thereby to driven clutch 32 (FIG. 2) and its sheaves 54 and 56 are held fully closed by the unopposed action of the driven clutch biasing means so that belt 36 loosely engages radially outer portions of the opposed faces of the driven clutch sheaves 54 and 56.

In one embodiment, as engine 18 speeds up, speed responsive means 39 and 38 of driving clutch 30 react to move axially moveable sheave 46 of driving clutch 32 towards fixed sheave 44 in opposition to the biasing or resistance force of the biasing or resistance means 60 of driving clutch 30. This movement of axially moveable sheave 46 results in belt 36 being engaged with the opposed conical faces of sheaves 44 and 46 and thereby being tensioned. Due to the increased frictional engagement of belt 36 with the faces of axially moveable sheave 46 and fixed sheave 44, belt 36 is gripped tighter and tighter by the driving clutch 30 until the force delivered by belt 36 to driven clutch 32 is sufficient to overcome the torque resistance offered by driven shaft 34, which resistance incidentally is quite high when track 17 is at rest. At this time, the transmission will be in a low speed, high torque delivery condition with belt 36 positioned inwardly on driving clutch 30 and outwardly on driven clutch 32, as illustrated in FIGS. 1 and 2.

Once snowmobile track 17 (FIG. 1) begins to rotate, the torque resistance offered by the driven shaft 34 decreases. It will be appreciated by one of ordinary skill in the art that the action of speed responsive or displacement means 39 and 38 of driving clutch 30 act against the biasing means of the driven clutch and the driving clutch so as to continuously effect an equilibrium condition in the transmission. As a result, the drive ratio of the transmission is thus continuously and infinitely variable in response to these two actions to attempt to produce a drive ratio suited to the existing operating conditions.

Conventional clutch tuning only allows tuning for either maximum performance or fuel efficiency. The present invention is a novel design for tuning a driving clutch to have the speed responsive means match the biasing or resistance means of the driving clutch and the belt side pressure supplied by the driven clutch in such a way that the engine is held near the power peak (i.e., maximum horsepower) all the way from low ratio to high ratio at full throttle and in such a way that the engine is held near the bottom of the power band for normal cruising speeds at partial throttle for maximum fuel efficiency, reduced noise, and reduced vibration.

Figure 3:
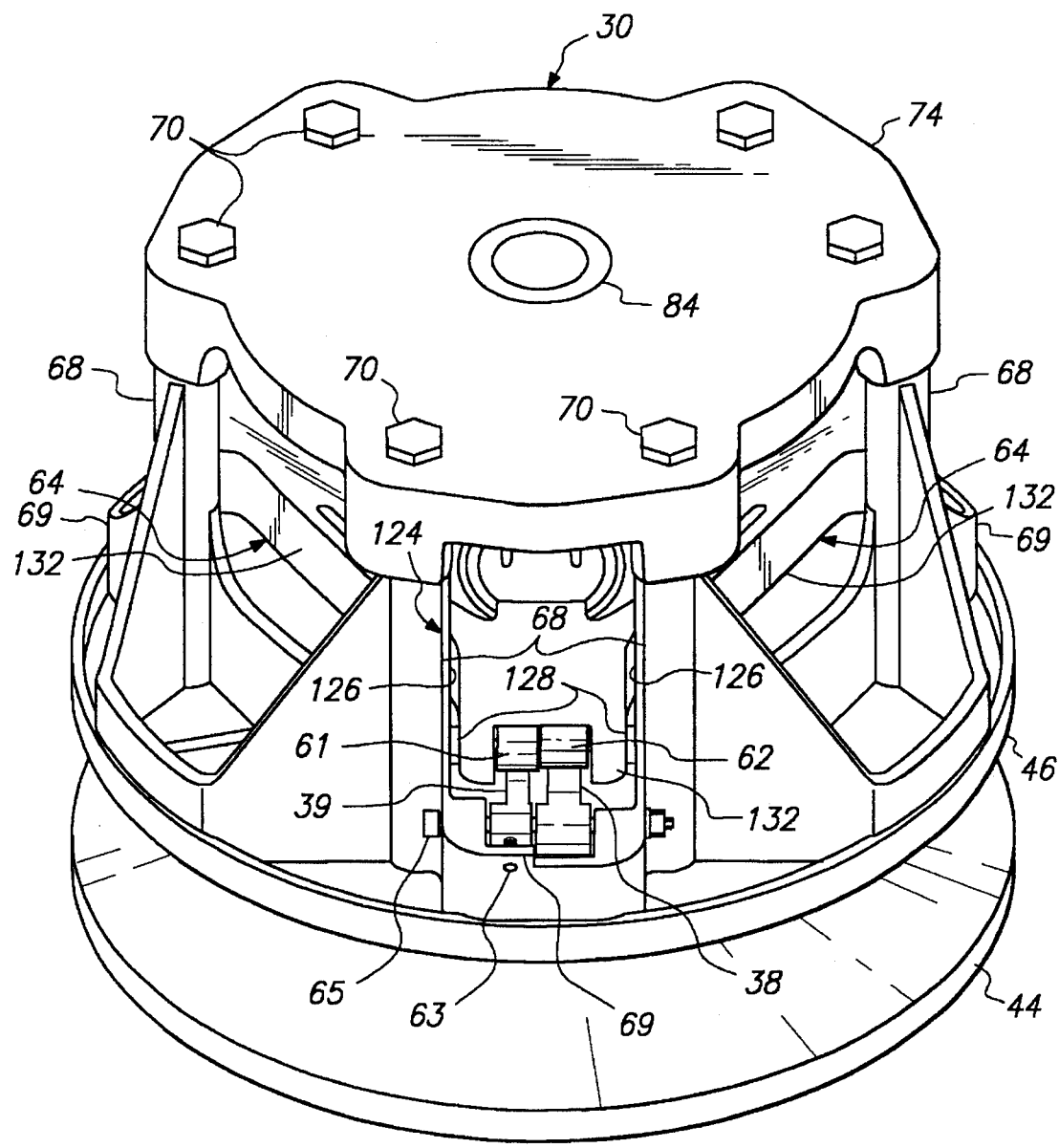
FIG. 3 is a perspective view of one embodiment of the drive clutch of the present invention.
Figure 4:
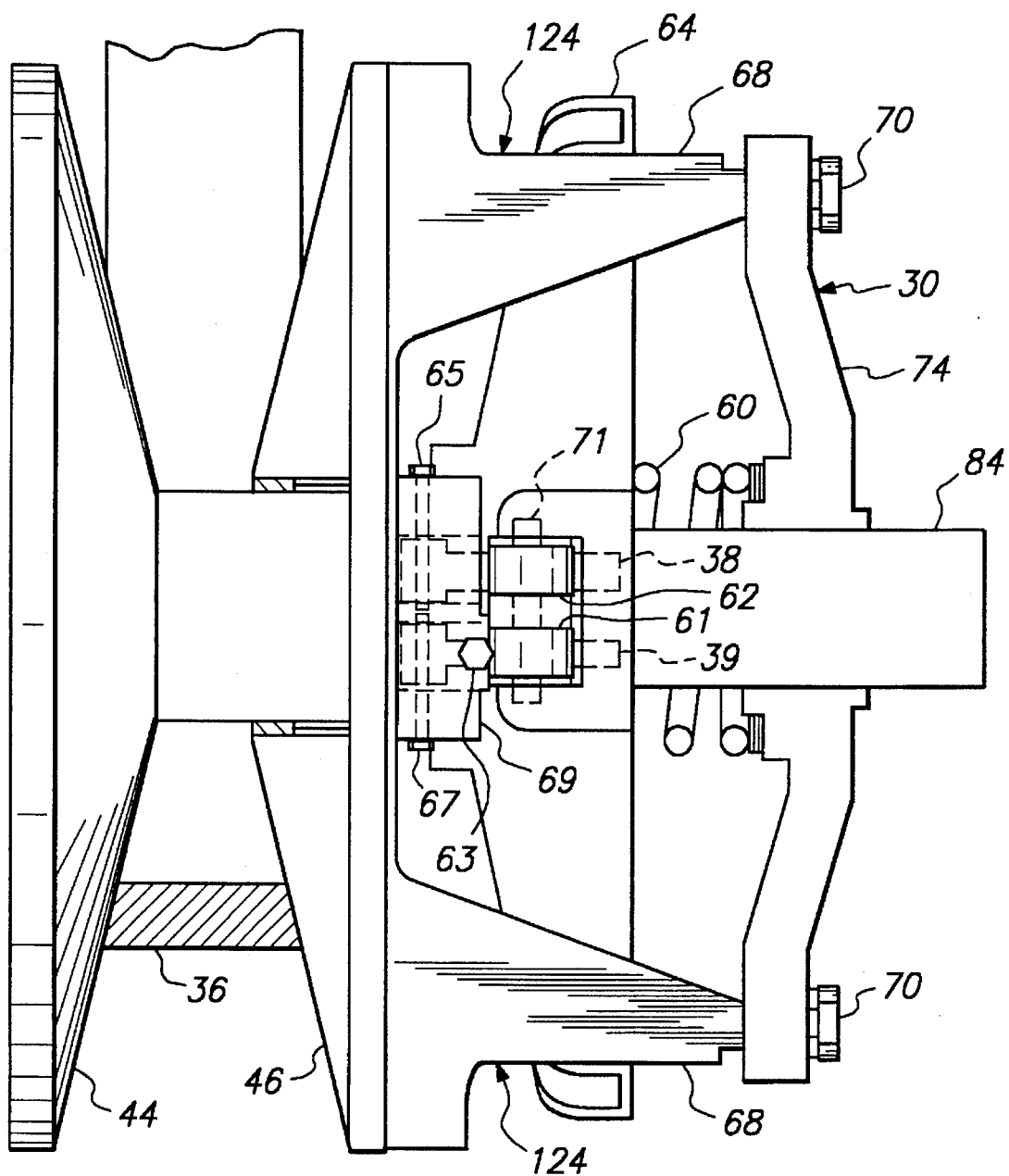
FIG. 4 is a top plan sectional view, partially in cross-section, of one embodiment of the drive clutch of the present invention.
Figure 5:
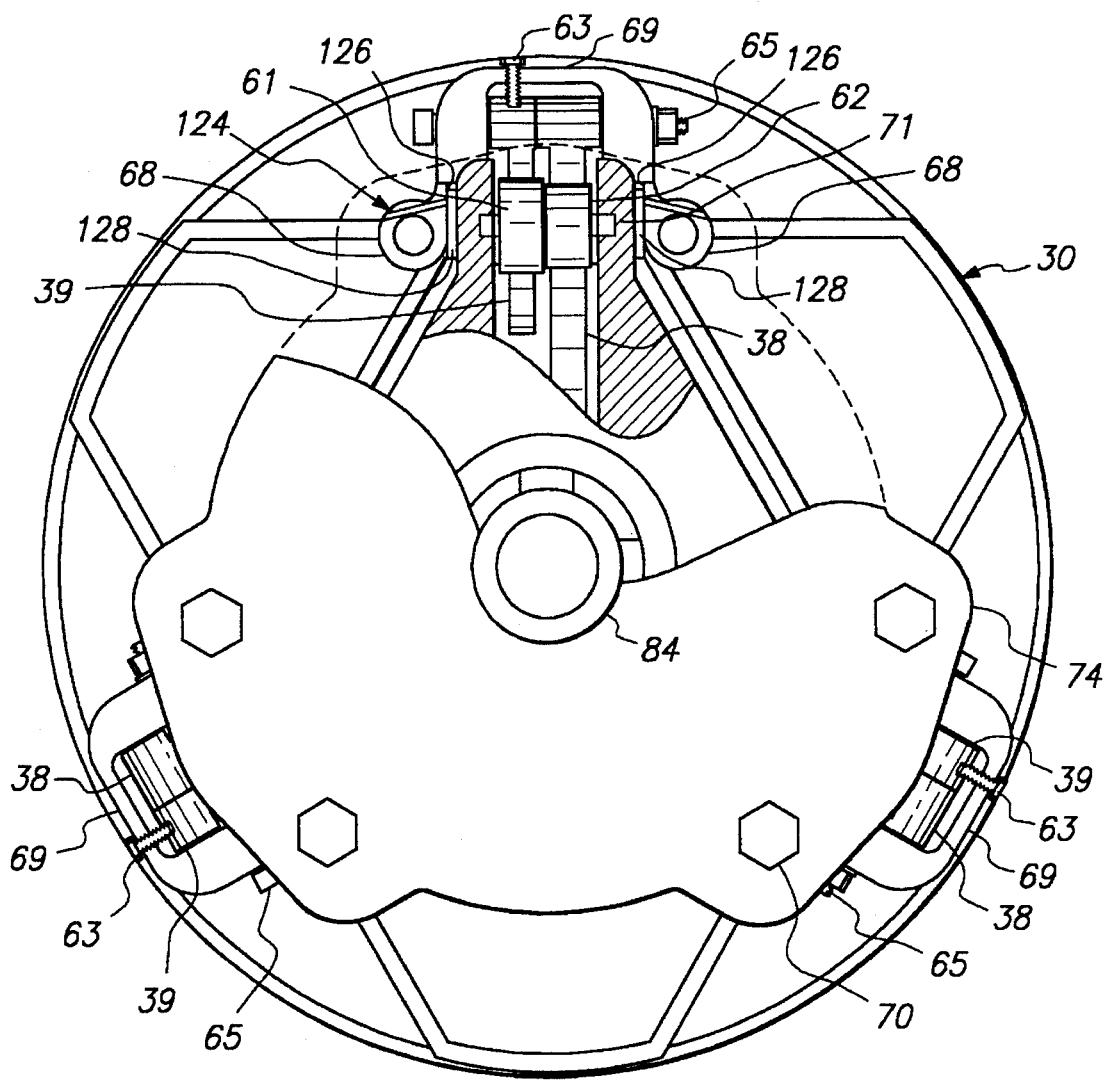
FIG. 5 is an end view, partially in cross-section, of another embodiment of the drive clutch of the present invention.

As can be seen in FIGS. 3–5, in one embodiment of the present invention the speed responsive means consists of two sets of cams or flyweights located on each column 124. In FIG. 5, part of end cover 74 and roller housing 64 have been cut-away to show displacement means 39 and 38 and rollers 61 and 62. Drive clutch 30 is a three column clutch. Each column 124 has two towers 68 spaced from each other with "button-contacting" surfaces 126. Tower bolts 70 extend through end cover 74 into columns 68 for attaching the end cover to movable sheave 46. Roller housing 64 (often referred to as a "spider" because of its shape or three "legs" 132) contains rollers 61 and 62 on pin element 71. Speed responsive means 39 and 38 are mounted to movable sheave 46 and work against rollers 61 and 62 mounted between towers 68 in each column 124 rotating with center column or shaft 84. Roller housing 64 also transfers the torque to the movable sheave through "buttons" (or contacts) 128 which slide along "button-contacting" surfaces 126 as movable sheave 46 is displaced by displacement means 39 and 38 acting on rollers 61 and 62.

Typically, the set of cams or flyweights 39 (i.e., the secondary cams) are of a different size, weight, and/or profile than the set of cams or flyweights 38 (i.e., the primary cams). Each roller 61 corresponding to each cam 39 is mounted coaxially on pin element 71 with each roller 62 corresponding to each can 38. The rollers and cams are initially in contact and remain in contact throughout the engine speed range until the secondary cams contact stop member 63. The primary and secondary cams shown in FIGS. 3–5 are mounted with their respective pivot points coaxial. However, in this embodiment, because secondary cams 39 may contain a notch to reduce the centrifugal force generated at the engagement speed, the diameter of each roller 61 is slightly larger than the diameter of each roller 62 so that there is contact between the secondary cams and rollers as moveable sheave 46 is displaced by the cams. Each set of cams corresponding to each column 124 can be mounted coaxially on the same pin 65 (i.e., nut and bolt) as shown in FIGS. 3 and 5, or can be mounted on separate pins 65 and 67 (i.e., screws) as shown in FIG. 4. It is advantageous to use separate pins 65 and 67 so that each cam in a set can be changed out without having to remove each secondary cam in the other set. In addition this allows the use of a notched cam, without resorting to rollers of different diameters, because the pin having the roller corresponding to the notched cam can be mounted higher so that the roller contacts the notch in the cam. Stop member (e.g., a set screw) 63 is located adjacent to each secondary cam 39 in base 69 which connects each tower 68 of column 124. The stop member preferably extends through the base and is adjustable, however, it can be fixed. The stop member is set to contact and stop each secondary cam 39 as the cam moves through its travel, which will be described in more detail below.

Figure 6:
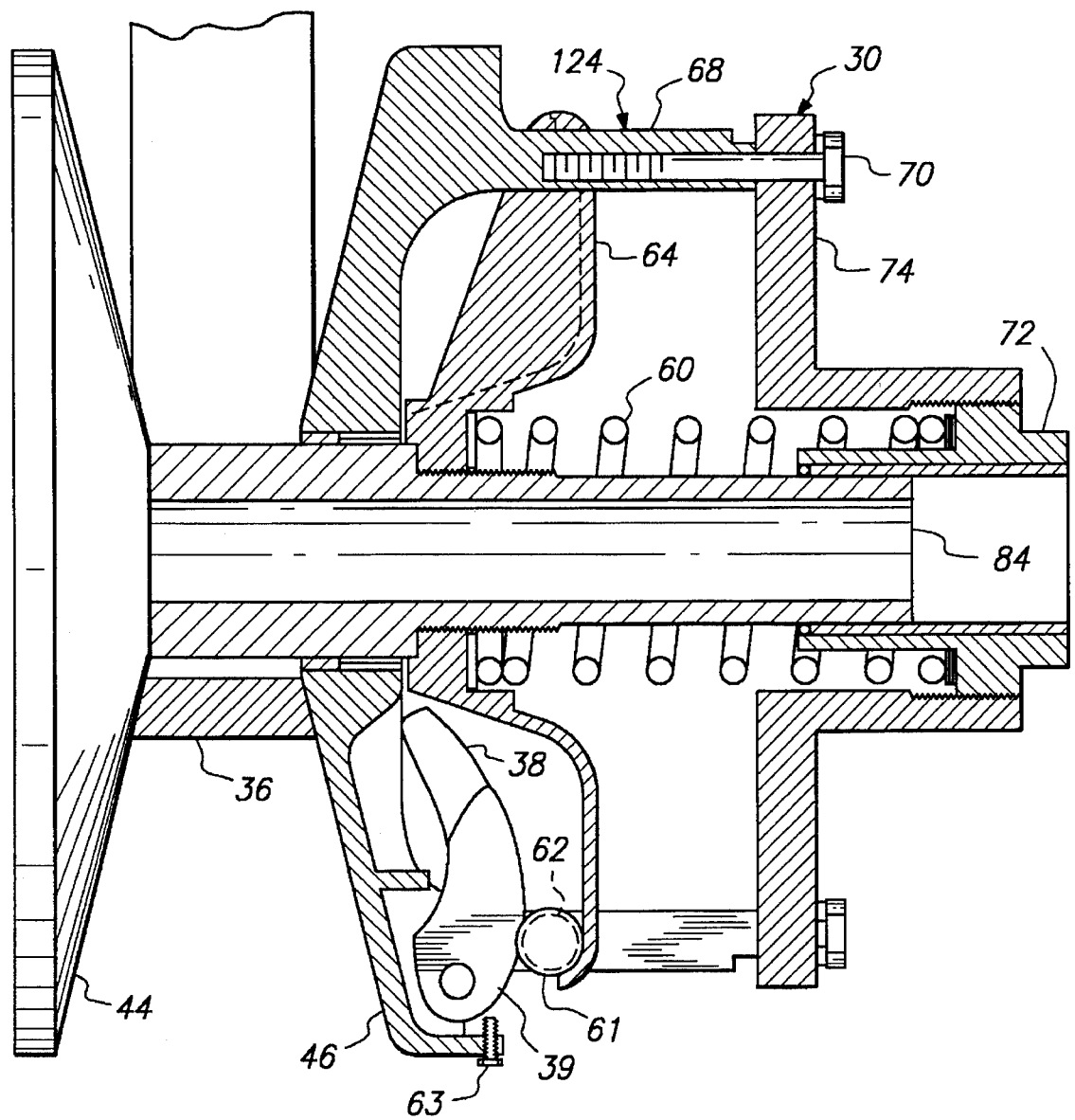
FIG. 6 is a top plan sectional view, partially in cross-section, of yet another embodiment of the drive clutch at rest in accordance with the present invention.
Figure 7:
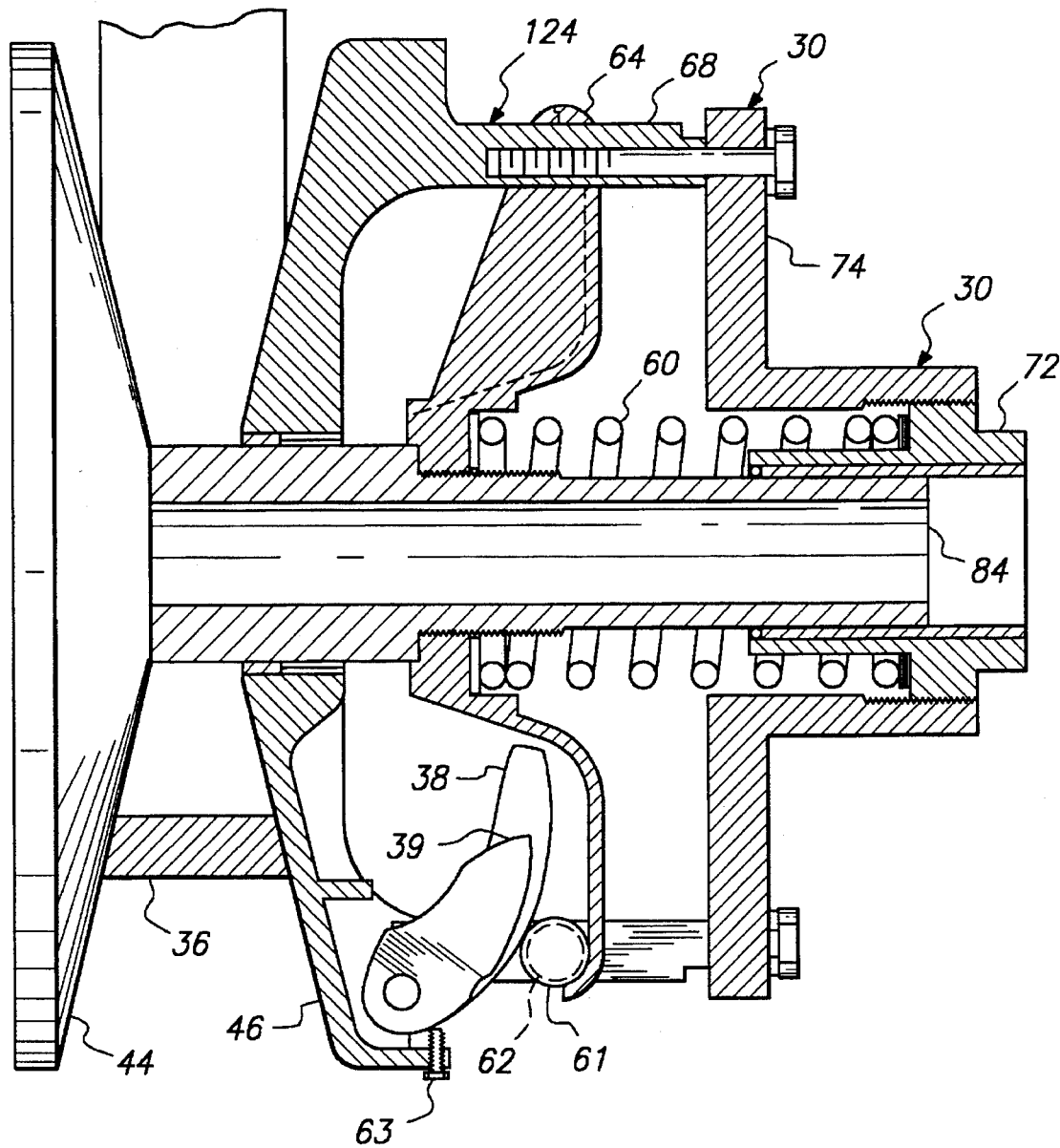
FIG. 7 is a top plan sectional view, partially in cross-section, of the drive clutch in FIG. 6 at partial displacement of the moveable sheave.
Figure 8:
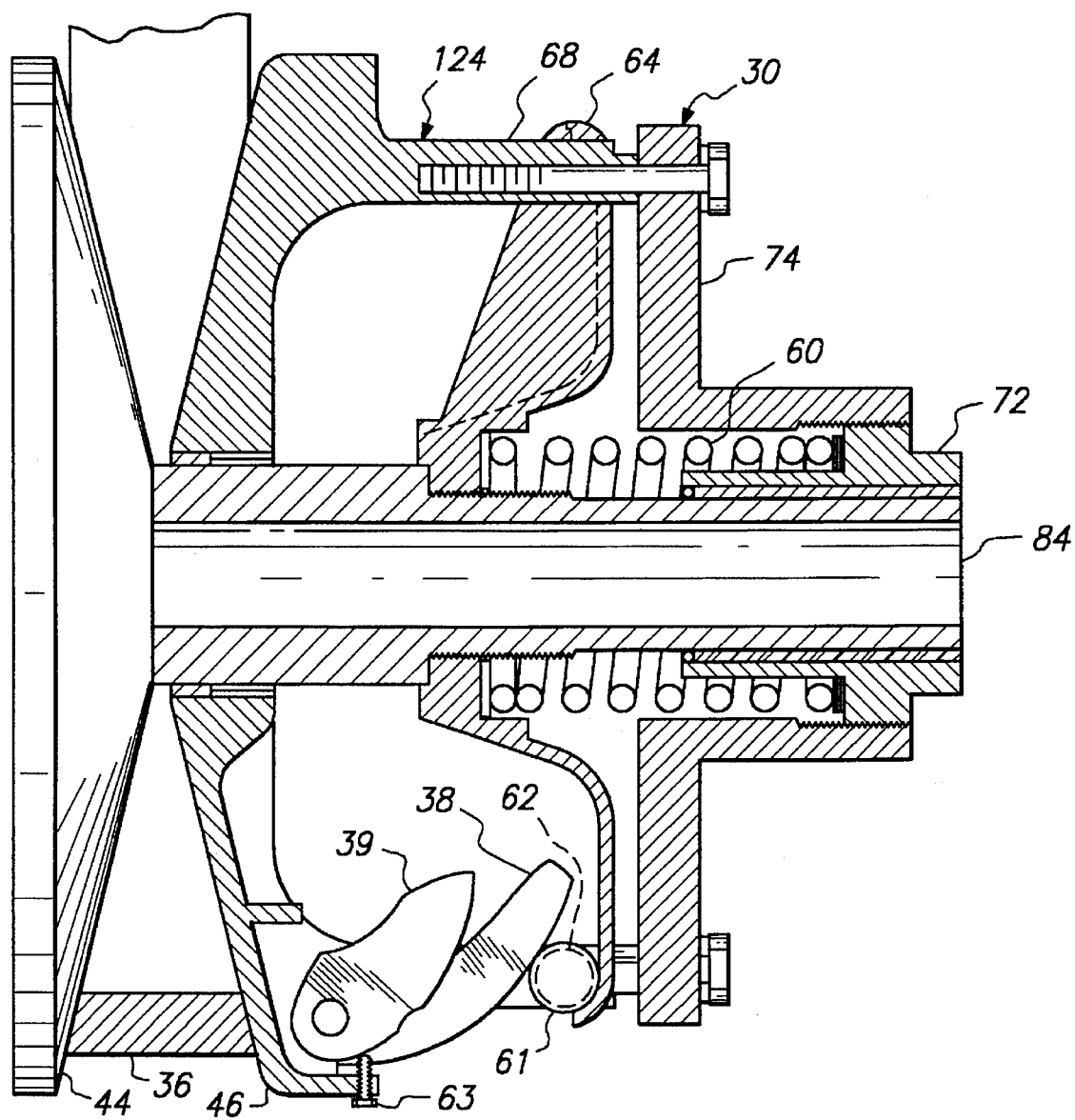
FIG. 8 is a top plan sectional view, partially in cross-section, of the drive clutch in FIG. 6 at full displacement of the moveable sheave.

With reference to FIGS. 6–8, the operation of one embodiment of the present invention is discussed. When the engine is idling, belt 36 sits loosely between fixed sheave 44 and moveable sheave 46. The speed of driving clutch 30 is sufficiently slow at this time that first speed responsive means 39 and second speed responsive means 38 are at rest against first roller 61 and second roller 62, respectively. As the drive shaft (not shown) rotates and the speed of driving clutch 30 increases, speed responsive means 39 and 38 (e.g., cams, weights, flyweights, balls, annular garter springs, actuators, etc.)(only one flyweight from each set is shown) are thrown outward against rollers 61 and 62 respectively by centrifugal force, because each set of cams may be of a different size, weight, and/or profile the displacement rate of the primary set may be different from the displacement rate of the secondary set of any given point. However, the displacement rate of each of the sets of cams combine to produce a single first displacement rate. The total displacement rate of speed responsive means 39 and 38 acting on rollers 61 and 62 push axially moveable sheave 46 of drive clutch 30 toward fixed sheave 44. Since sheaves 44 and 46 are tapered, this axial movement causes endless drive belt 36 to ride up the conical surfaces of both sheaves 44 and 46. Biasing or resistance means 60 is under compression between roller housing 64 and end cover 74. It is noted that end cover 74 shown in FIGS. 6–8 is slightly different than end cover 74 shown in FIGS. 3–5, 10 and 11 because of the addition of adjustable end cap 72 (to be discussed later) but operates to oppose the force of the biasing means in a like manner. The force of biasing or resistance means 60 is transmitted through towers 68 and tower bolts 70 (only one shown) to moveable sheave 46 to oppose the force from speed responsive means 39 and 38. The friction created by drive belt 36 against sheaves 44 and 46 allows torque to be transmitted to a driven clutch (not shown) which works in a similar opposing manner, providing an infinitely adjustable source of torque.

As shown in FIG. 7, when drive clutch 30 reaches a predetermined rotational speed, which corresponds to a predetermined axial displacement of movable sheave 46 toward fixed sheave 44 and to the speed diagram shown in FIG. 14, speed responsive means 39 comes into contact with stop member 63. Stop member 63 prevents secondary speed responsive means 39 from swinging out farther at this point regardless of any additional rotational primary speed of drive clutch 30. However, primary speed responsive means 38 does continue to swing out as the rotational speed of the drive clutch increases. Therefore, primary speed responsive means 38 continues to exert force against roller 62 in order to continue to displace movable sheave 46 toward fixed sheave 44 so that belt 36 is pushed up along the sheaves and the transmission continues to upshift. When this transition occurs, secondary speed responsive means 39 no longer exerts force against roller 61 therefore the drive clutch transitions from the first displacement rate to a second displacement rate. In other words, the continuously variable transmission automatically transitions between one upshift profile to a second upshift profile. As seen in FIG. 8, during the second upshift profile as the rotational speed of the drive clutch is increased, primary speed responsive means 38 continues to move and exert force on roller 62 so as to displace movable sheave 46 toward fixed sheave 44 and to move belt 36 all the way out into high gear.

In accordance with one embodiment, biasing or resistance means 60 is a heavy rate compression spring, preferably in the range of 150 to 400 lbs/in, and more preferably in the range of 250 to 300 lbs/in. Typically, the coil diameter is in the range of 1.40 to 2.50 inches. The wire diameter is typically in the range of 0.140 to 0.270 inches. It is contemplated that a variable rate biasing means as disclosed in the parent application, U.S. patent application Ser. No. 08/294,043 filed Aug. 24, 1994, now U.S. Pat. No. 5,460,575 issued Oct. 24, 1995, to which this application is a continuation-in-part continuing application and which is incorporated herein by reference in its entirety can also be used for biasing or resistance means 60.

The biasing or resistance means is illustrated as a helical coil spring but the biasing or resistance means can be a variety of biasing or resistance means such as, but not limited to electromechanical actuators, mechanical actuators, pneumatic actuators, hydraulic actuators, elastomers, wave springs, air bladders, pneumatic devices, hydraulic devices, electromechanical devices, etc. Likewise, the speed responsive means are illustrated as cams but can be a variety of means such as, but not limited to a ramp and ball combination (as disclosed in U.S. Pat. No. 3,975,964 issued Aug. 24, 1976 to Adams and U.S. Pat. No. 3,362,242 issued Jan. 9, 1968 to Watkins which are incorporated herein by reference in their entirety), or an actuator or device of the type listed above for the biasing or resistance means.

There are several important considerations in using the multi-staged transmission belt driving system of the present invention. First, setting the engine speed at which moveable sheave 46 of driving clutch 30 engages endless belt 36 as the rotational speed of the driving clutch is increased (i.e., engagement point 100 in FIG. 14.) Second, setting the engine speed at which speed responsive means 39 and 38 overcome the side pressure of the driven clutch and biasing or resistance means 60 of driving clutch 30 so that belt 36 starts to move outward or shiftout on driving clutch sheaves 44 and 46 (i.e., shiftout point 102 in FIG. 14.) For maximum performance, the shiftout point 102 should be at the power peak of the engine at the top of power band 96. For maximum fuel efficiency, the shiftout point 102 should be at the lower part of power band 96. Third, setting the rate at which the moveable sheave moves axially relative to the acceleration rate and thus the rate at which belt 36 moves outward on driving clutch sheaves 44 and 46 during the low parasite drag. In other words, setting the shift rate during low parasite drag (i.e., portion 104 of shift curve 93). Fourth, setting the rate at which the moveable sheave moves axially and thus the rate at which belt 36 moves outward on driving clutch sheaves 44 and 46 during the high parasite drag. In other words, setting the shift rate during high parasite drag (i.e., portion 106 of shift curve 93). Shift curve 93 represents a partial throttle acceleration profile utilizing a driving clutch in accordance with the present invention.

The present invention accommodates all of these considerations. With reference to FIG. 6, engagement speed 100 at which moveable sheave 46 of driving clutch 30 engages endless belt 36 as the rotational speed of driving clutch 30 is increased is determined by the amount of pretension or preload that has been applied to biasing or resistance means 60 when installed. The amount of pretension can be adjusted by many ways known by one of ordinary skill in the art.

In the embodiment shown in FIGS. 6–8, the amount of pretension can be adjusted by rotating threaded end cap 72. By rotating threaded end cap 72 inward toward roller housing 64, additional pretension is applied. Therefore, a greater engine speed, thus rotational speed is required of driving clutch 30 before speed responsive means 39 and 38 acting on rollers 61 and 62 push axially moveable sheave 46 enough to engage belt 36. Conversely, by rotating threaded end cap 72 outward away from roller housing 64, less pretension is applied (i.e., the preload is decreased). Therefore, less rotational speed of driving clutch 30 is required before the speed responsive means push moveable sheave 46 enough to engage belt 36.

Figure 12:
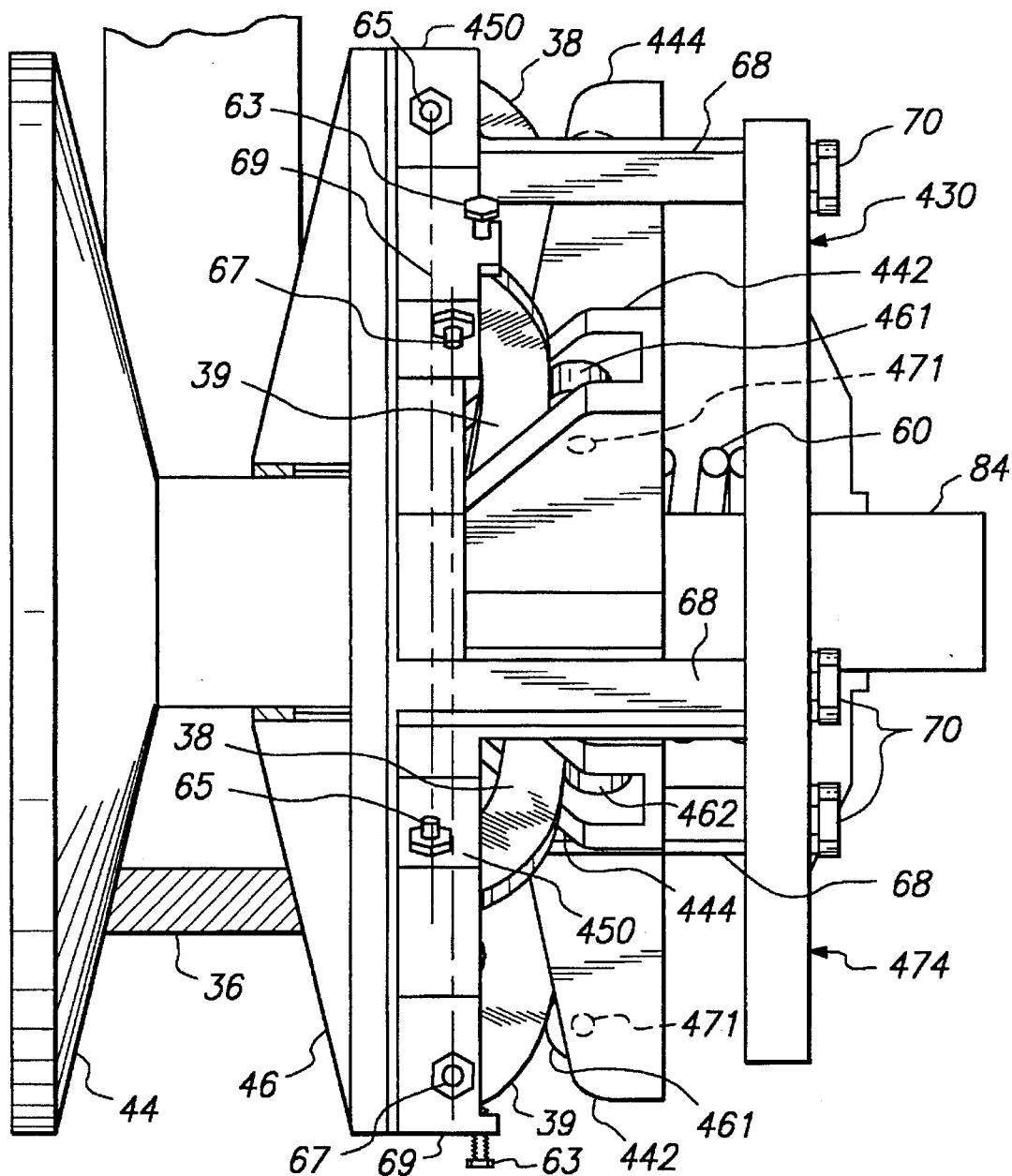
FIG. 12 is a top plan view, partially in cross-section, of another embodiment of the drive clutch of the present invention at partial displacement of the moveable sheave.
Figure 13:
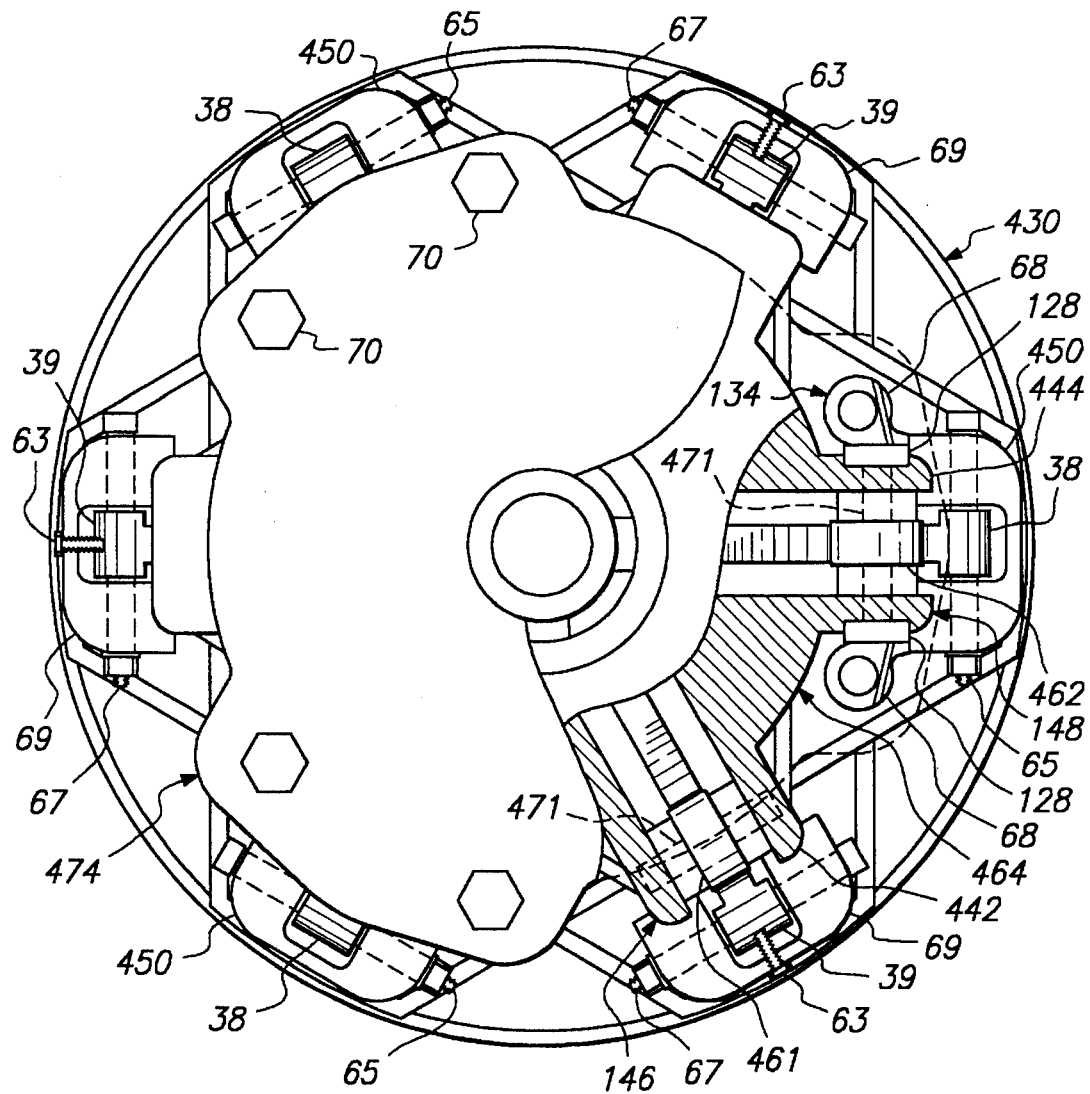
FIG. 13 is an end view, partially in cross-section, of the drive clutch in FIG. 12.

In another embodiment shown in FIGS. 12 and 13, the preload can be adjusted by locating the cam pins 65 and 67 at points which allow one or both of the cams to "tuck under". At the engagement speed, the tucked under position of the cams reduces the displacement force generated therefore, the pretension can be lower.

In another embodiment, the displacement rate is adjusted by the size, weight and/or profile of the secondary cam. A lighter weight produces a lower displacement rate and high engagement speed. In another embodiment (FIGS. 5 and 6), the profile of the cam includes a notch to delay the full effect of the secondary cam's axial force on the sheaves. The notch initially prevents the secondary cam from exerting much of an axial force. When the roller is in the notch the axial force generated by the secondary cam is essentially negligible compared to the axial force of the primary cam. Then, as the rotational speed increases, the secondary cam moves out of the notch and exerts more axial force with the primary cam. In another emobidment, the pin location radially with respect to the center shaft can be closer or farther, causing a different displacement rate between the cams.

Shiftout point 102 occurs when the centrifugal force of speed responsive means 39 and 38 acting on rollers 61 and 62 overcome the belt side pressure applied to belt 36 by the biasing means in driven clutch 32 and the driving clutch 30. A conventional helix with a low angle and conventional driven clutch biasing means can be used with the present invention, thus there is no need to degrade the backshifting of the driven clutch by using a multiple or steep angle helix as does the current state of the art. Tuning the upshift of the driving clutch by using a multiple or steep angle helix is counter-productive because it degrades the backshifting of the transmission.

Shiftout point 102 is also controlled by the amount of throttle applied by the user. Using speed responsive means 39 and 38 in accordance with the present invention and a partial throttle acceleration, the transmission will have shiftout speed 102' (FIG. 14). With full throttle acceleration, the transmission will have shiftout speed 102".

The rate at which moveable sheave 46 moves axially and thus the rate at which the belt moves outward on the sheaves 44 and 46 of driving clutch 30 during the low parasite drag portion of the upshift (approximately 20 to 50 m.p.h. for a snowmobile) as the vehicle speed increases corresponds to straight portion 104 of shift curve 93 (FIG. 14). Portion 104 of shift curve 93 is controlled by using speed responsive means 39 and 38 collectively. Ideally, the engine speed is held constant in portion 104 while the transmission is shifting out and the vehicle speed is increasing.

With reference to the rate at which belt 36 moves outward on driving clutch sheaves 44 and 46, as the rotational speed of driving clutch 30 increases speed responsive means 39 and 38 swing outward against rollers 61 and 62 by centrifugal force. This movement is opposed by the biasing or resistance means 60. The belt pressure applied by the driven clutch also opposes the speed responsive means but will be omitted for purposes of this discussion except to say that with the present invention lower belt pressures are required than with prior art inventions thus making the present invention more efficient. Biasing or resistance means 60 is tinder compression between roller housing 64 and end cover 74. Initially, displacement means 39 and 38 swing outward simultaneously (i.e., in concert), whether the same size, profile and/or weight, and exert a first stage displacement rate against the respective rollers 61 and 62 to displace (i.e., axially move) moveable sheave 46 toward fixed sheave 44. The movement of both displacement means simultaneously provides one linear displacement rate that is relatively high in order to transition through the inefficient portion (i.e., 3:1 ratio portion) of the shift curve relatively quickly.

The displacement means system operates under the basic physical rules governing centrifugal force. The basic mathematical formula for centrifugal force is:

Force=mass x radius x speed$^2$ where:

mass=mass of the cam radius=radius of the center of gravity from the center line of rotation speed=the rotational speed of the drive clutch.

Several observations are important from the above formula. First, the heavier the cam (or combination of cams) the more force it produces. Second, when the cam swings out, the center of gravity moves farther away from the center of the drive clutch (i.e., the radius increases) and thus the force increases. Because it is advantageous to have the force decrease as the cam swings out, traditionally the increased radius is compensated for by a cam profile which transfers less force. Third, centrifugal force increases with the square function of the rotational speed. See Olav Aaen's "Clutch Tuning Handbook," Kenosha, Wis. (1993), which is incorporated herein by reference in its entirety, for a good discussion of centrifugal force and the operation of the cam system.

In this example, when first displacement means 39 and second displacement means 28 are acting together, a first stage displacement rate (or centrifugal force) is acting against biasing means 60. Displacement means 39 and 38 act in concert until they have rotated out enough for first displacement means 39 to contact stop member 63 (FIG. 7). At that point, first displacement means 39 is stopped from further movement by stop member 63. Then with any further increase in the rotational speed of driving clutch 30, second displacement means 38 acts alone to displace moveable sheave 46 with a second stage displacement rate (or centrifugal force) as the second displacement means 38 continues to swing outward (FIG. 8).

With reference to FIG. 14, at partial throttle acceleration 93, first displacement means 39 and second displacement means 38 act in concert while the engine operates in bottom part 98 of power band 94 along portion 104 of shift curve 93. By operating the engine at those predetermined speeds greater fuel efficiency and lower noise and vibration are achieved at normal cruise speeds.

At predetermined vehicle speed 107, the vehicle transitions from cruising speeds to performance speeds. At speed 107, first displacement means 39 contacts stop member 63. At that point, second displacement means 38 operates alone. The engine speed then transitions to portion 106 of shift curve 93 where second displacement means 38 acts to oppose biasing or resistance means 50. Shift curve 97 represents a conventional clutch operating at partial throttle. As FIG. 14 shows, the engine speed is not held in the fuel efficient portion of the power band 94 for very long with a conventional clutch set-up.

The rate at which the moveable sheave moves axially and thus the rate at which belt 36 moves outward on driving clutch sheaves 44 and 46 during high parasite drag portion 106 of the upshift as the vehicle increases speed is controlled by second speed responsive means 38 acting alone. High parasite drag becomes a factor where the vehicle will no longer accelerate without additional engine speed. For a typical snowmobile, that point coincides with a speed of approximately 40 m.p.h. Ideally, the engine speed is held constant during portion 106 while the transmission is shifting out farther. At the point where high parasite drag becomes a factor, the axial movement of moveable sheave 46 and thus the rate that belt 36 moves up sheaves 44 and 46 needs to be slowed so that enough torque is transmitted to driven clutch 32 through endless belt 36 to compensate for or overcome the high parasite drag.

The transmission is tuned so that first speed responsive means 39 is stopped and second speed responsive means 38 begins to act alone so as to change the engine speed from lower part 98 of power band 94 where the engine operates the most efficiently to higher part 96 of power band 94 to effect a high performance condition. In other words, the movement of the secondary cams 39 is stopped causing the total mass to be limited to the force of the primary cams 38. The benefit of this is that the clutch is tuned to utilize both speed responsive means for quick upshifting, but then to utilize only one speed responsive means to prevent the engine from over shifting its power band by limiting the total mass of the speed responsive means to that of only the primary cams when parasite and/or power requirements increase.

At the predetermined displacement point (or rotational speed of the drive clutch) chosen to correspond to the beginning of a performance speed range, first speed responsive means 39 has moved enough to contact stop member 63. At that point, second displacement means 38 continues to swing out but operates alone to provide a second linear displacement rate. The second linear displacement rate is relatively lower than the combined displacement rate of displacement means 39 and 38 operating together because there is less mass. The result being that the rate at which belt 36 travels up sheaves 44,46 is slowed and more torque is transmitted to driven clutch 32 through belt 36 to compensate for the increased parasite drag.

With reference to FIG. 14, at full throttle acceleration the transmission with the multi-stage speed responsive means installed operates along shift curve 95. As discussed above at full throttle acceleration the transmission will shiftout at shiftout speed 102". Then the speed responsive means in accordance with the present invention will operate the engine speed at the top 96 of power band 94 so that maximum performance is achieved as opposed to maximum fuel efficiency.

The present invention also provides advantages in the back shifting of the transmission because the belt side pressure can be lower in the driven clutch during the low parasite drag portion because the engine speed is reduced. Another advantage to the present invention relates to the torque load. The highest torque load on the drive clutch occurs near the 3:1 ratio area and it decreases as the transmission moves into the 2:1 to 1:1 ratio area. With the present invention, when the drive clutch is under the highest torque load that load is spread over at least six rollers and six weights. When the torque load decreases in the 2:1 to 1:1 ratio area, the drive clutch switches to operating on three rollers and three weights.

As one of ordinary skill in the art is aware the tuning of variable speed belt drive transmissions is a trial and error procedure that becomes more simplified with experience. There are different biasing means and speed responsive means combinations depending on, but not limited to, such things as the vehicle or machine, the altitude, ground or snow conditions and engine horsepower. There are also variations depending on how the machine is to be used (i.e., drag racing, hill climbs, cross country racing, touring, etc.). With the present invention, the driving clutch can be tuned to maximize the fuel efficiency of the engine, to attain the highest performance for the engine, or a combination of both.

As will be recognized by one of ordinary skill in the art, selection of the two sets of cams is a relatively simple procedure. First, find a set of cams that gives the best performance by holding the engine speed at its power peak. Generally, a lighter weight. Second, find a set of cams that gives the best fuel efficiency by holding the engine speed at the bottom of the power band. Generally, a heavier weight. The weights of each of these two sets are the two desired weights for use in the present invention. Third, because the weight that corresponds to the best fuel efficiency is achieved in one embodiment of the present invention by two sets of cams acting in concert, the second set of cams is replaced with an even lighter set of cams corresponding to the difference in weight between the first (light) and second (heavy) sets of cams, such that the combination of the original light set and the second set equal the shift pattern of what the original heavier weight set was determined to be.

Figure 9:
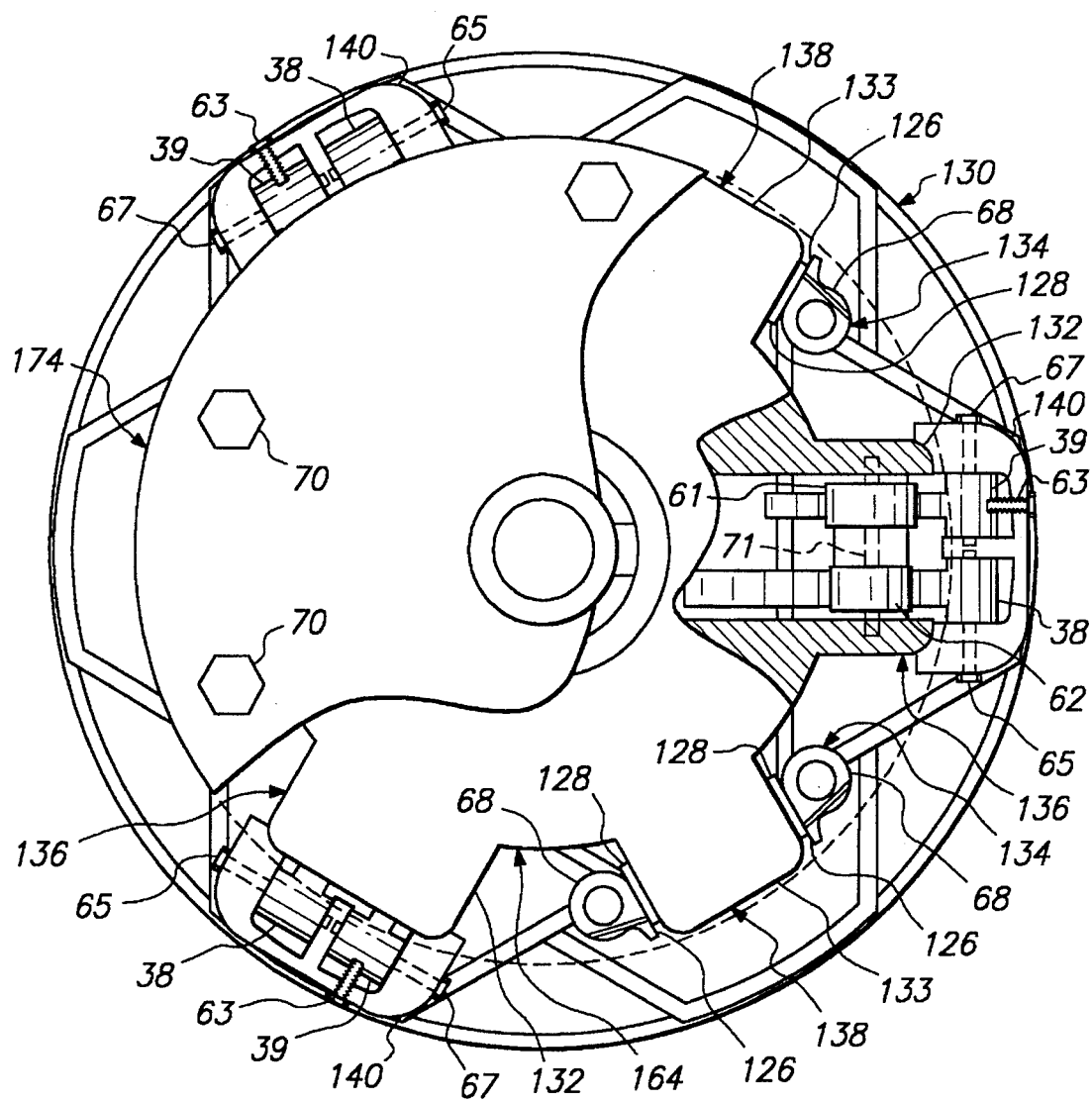
FIG. 9 is an end view, partially in cross-section, of another embodiment of the drive clutch of the present invention.

FIG. 9 is directed to another embodiment of the present invention. Drive clutch 130 operates the same as previously discussed drive clutch 30 except that drive clutch 130 is a modified three column clutch. Part of end cover 174 and roller housing 164 have been cut-away to show the displacement means and rollers. In modified three column drive clutch 130, the "buttons" 128 and rollers 61 and 62 have been separated onto the six "legs" 132. Roller housing 164 has six "legs" (three indicated by reference numeral 132 and three indicated by reference numeral 133), as opposed to the three "legs" on roller housing 64. On ends 136 of the three legs of roller housing 164 are located rollers 61 and 62 mounted on pin element 71 as previously described with respect to drive clutch 30. However, "buttons" 128 are not on ends 136 of the legs 132, instead "buttons" 128 are on ends 138 of the three legs.

As a result of "buttons" 128 being on separate "legs" of the roller housing 164, there are still three columns 134 (essentially the same as the three columns 124 on drive clutch 30) with "button-contacting" surfaces 126. However, instead of stop element 63 being located in base 69 of each column 124, stop element 63 is located in base element 140 which is essentially the same as base 69 except that base element 140 does not attach to any towers to form a column. Each set of cams corresponding to each base element 140 can be mounted coaxially on the same pin or can be mounted on separate pins 65 and 67. Stop member (e.g., a set screw) 63 is located adjacent to each cam 39 in base element 140. The stop member preferably extends through the base member and is adjustable. However, the stop member can be fixed. By moving the rollers and cams to legs that are not located between two towers, the rollers and cams can be accessed more easily for adjustment and replacement.

Figure 10:
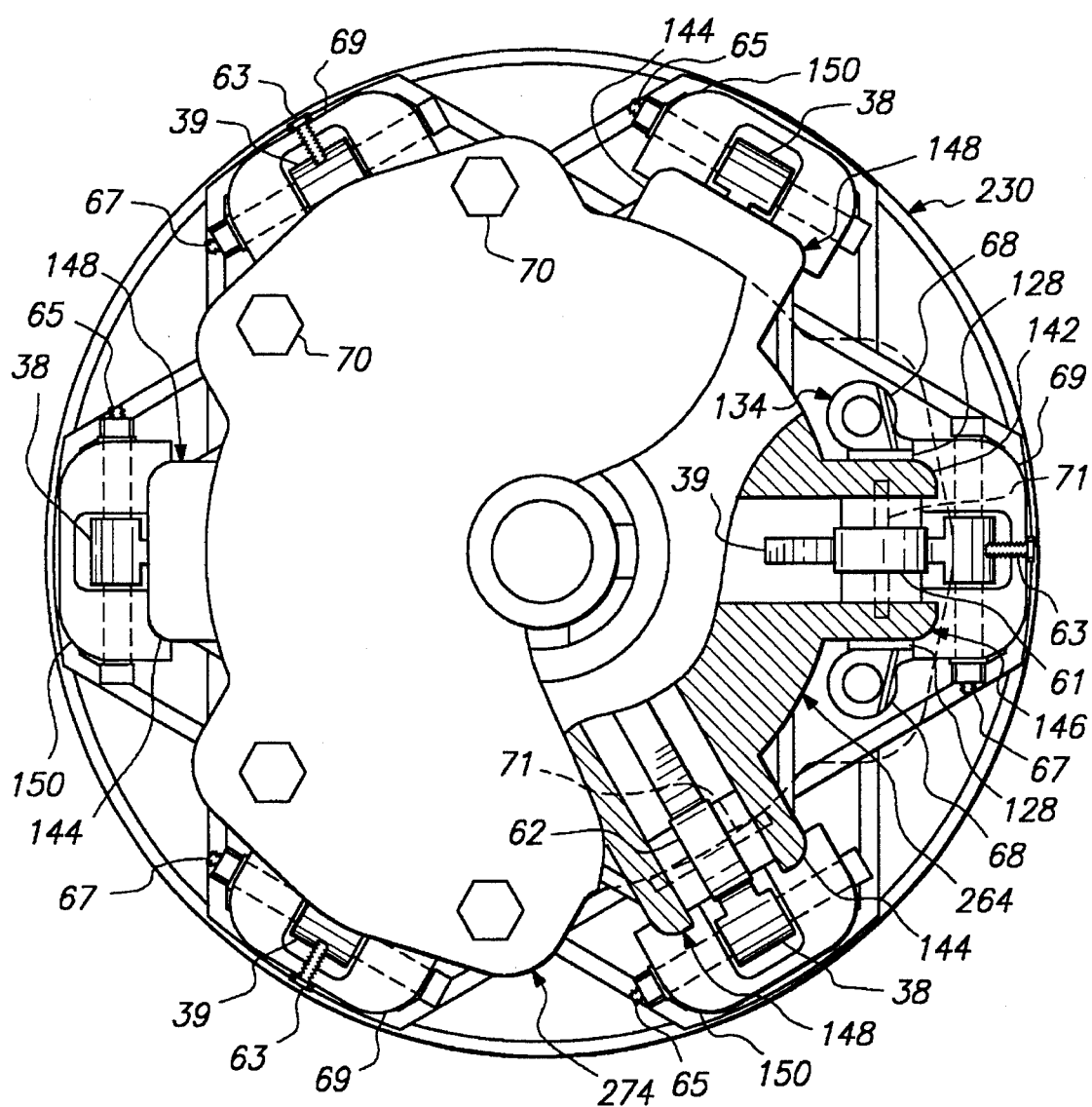
FIG. 10 is an end view, partially in cross-section, of still another embodiment of the drive clutch of the present invention.

FIG. 10 shows another embodiment of the present invention which achieves all of the objectives of the present invention. Drive clutch 230 operates similar to the drive clutches previously discussed. Drive clutch 230 is another embodiment of a modified three column clutch. Part of end cover 274 and roller housing 264 have been cut-away to show the displacement means and rollers. In modified three column drive clutch 230, the rollers (thus the displacement means) have been distributed to individual "legs" (three indicated by reference numeral 142 and three indicated by reference numeral 144) of roller housing 264. Larger diameter rollers 61 are mounted on pin elements 71 in end 146 of each "leg" 142 and smaller diameter rollers 62 are mounted on pin elements 71 in end 148 of each "leg" 144. The "buttons" 128 are on ends 146 on the three "legs" 142. As a result of "buttons" 128 being on the ends of "legs" 142 of the roller housing 264, there are still three columns 134 (only one shown)(essentially the same as the three columns 124 on drive clutch 30) with "button-contacting" surfaces being located in base 69 of each column 134. Each cam 39 corresponding to each base 69 is mounted on pin 67. Stop member 63 is located adjacent to each cam 39 in base 69. Each cam 38 corresponding to each roller 62 is mounted on pin 65 in base element 150.

Figure 11:
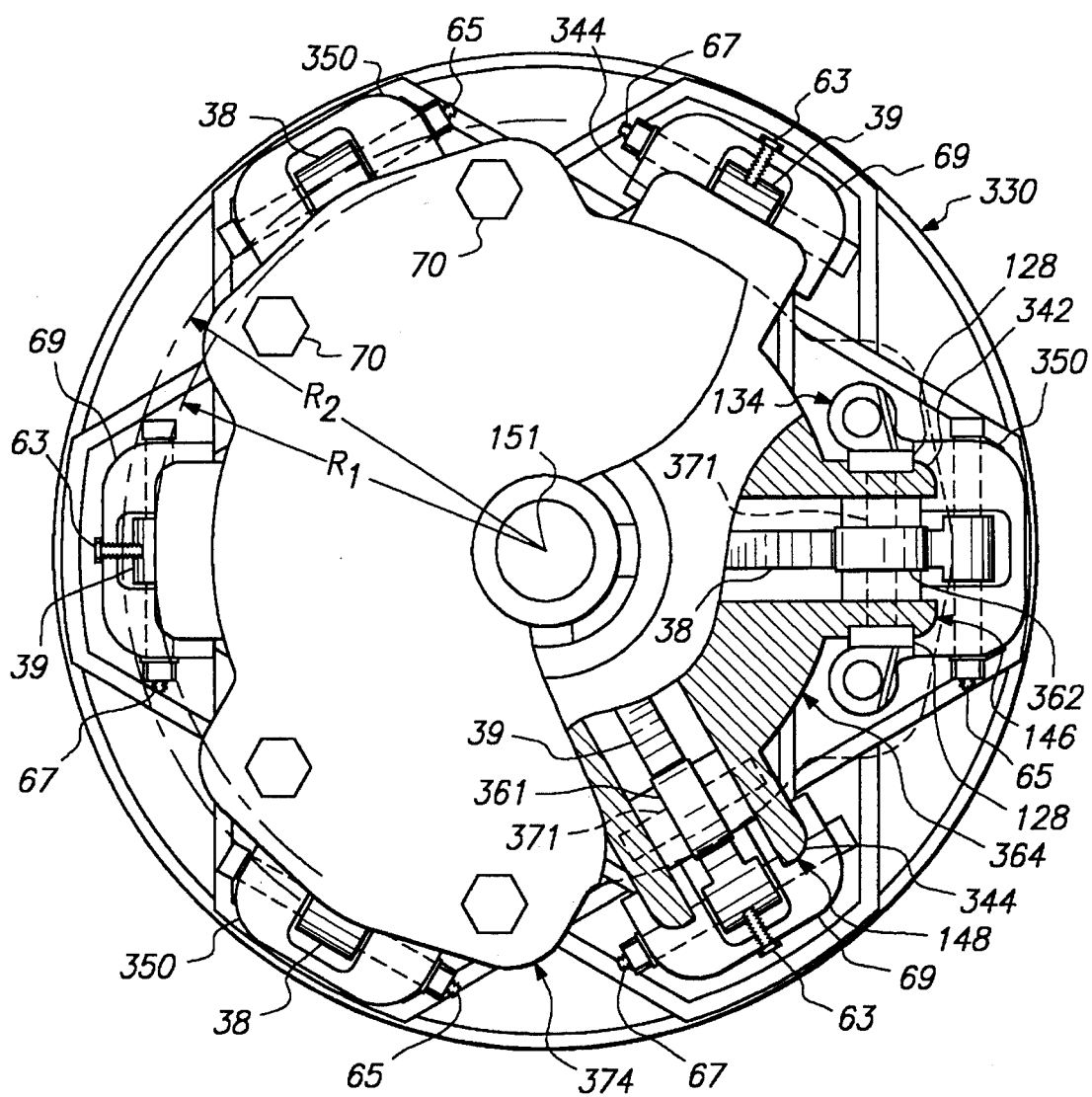
FIG. 11 is an end view, partially in cross-section, of yet still another embodiment of the drive clutch of the present invention.

FIG. 11 shows yet another embodiment of the present invention which achieves all of the objectives of the present invention. Drive clutch 330 shows another configuration for altering the effect of the displacement means during operation. Drive clutch 330 operates similar to the drive clutches previously discussed. Drive clutch 330 is another embodiment of a modified three column clutch. Part of end cover 374 and roller housing 364 have been cut-away to show the displacement means and rollers. In modified three column drive clutch 330, the rollers (thus the displacement means) have been distributed to individual "legs" (three indicated by reference numeral 342 and three indicated by reference numeral 344) of roller housing 364. The "buttons" 128 are on ends 146 on the three "legs" 342. As a result of "buttons" 128 being on the ends of "legs" 342 of tile roller housing 364, there are still three columns 134 (only one shown)(essentially the same as the three columns 124 on drive clutch 30) with "button-contacting" surfaces.

Rollers 361 are mounted on pin elements 371 in end 146 of each "leg" 342 and rollers 362 are mounted on pin elements 371 in end 148 of each "leg" 344. In this embodiment, rollers 361 and 362 are of equal diameter. Each cam 39 corresponding to each base 69 is mounted on pin 67. Stop member 63 is located adjacent to each cam 39 in base 69. Each cam 38 corresponding to each roller 362 is mounted on pin 65 in base element 350. In this embodiment, pins 67 and thus the pivot points of cams 39 are located closer to center 151 than are pins 65 and thus the pivot points of cams 38. Pins 67 are located at radius $R_1$ and pills 65 are located at radius $R_2$, therefore, the radius from center 151 to the center of gravity of each cam 39 is shorter than the radius from center 151 to the center of gravity of each cam 38. Using the formula for centrifugal force discussed above, it can be seen that since the radius is smaller for each cam 39 that the force exerted by cams 39 (when cams 39 and 38 are the same size, profile, and/or weight) is less than the force exerted by cams 38. This embodiment achieves the same result as previously discussed. Initially, cams 39 and 38 act together to produce a first displacement rate, then when cams 39 have moved out a predetermined amount to contact stop members 63, cams 38 act alone to produce a second displacement rate.

FIGS. 12 and 13 are still yet another configuration for altering the setup of the drive clutch components and still achieving the desired results of the present invention. Part of end cover 474 and roller housing 464 have been cutaway to show the displacement means and rollers. Drive clutch 430 is quite similar to the configuration of drive clutch 230 except for the differences describe below. "Buttons" 128 are mounted on columns 134 with cams 38 that are not associated with a stop member 63. In addition, rollers 461 and 462 are the same diameter, likewise, cams 39 and 38 are of the same profile, size and/or weight, although they can be different. The rollers (thus the displacement means) have been distributed to individual "legs" (three indicated by reference numeral 442 and three indicated by reference numeral 444) 0f roller housing 464.

Rollers 461 are mounted on pin elements 471 in end 146 of each "leg" 442 and rollers 462 are mounted on pin elements 471 in end 148 of each "leg" 444. Each cam 39 corresponding to each base 69 is mounted on pin 67. Stop member 63 is located adjacent to each cam 39 in base 69. Each cam 38 corresponding to each roller 462 is mounted on pin 65 in base element 450. This embodiment uses what is often referred to as "tucking under". See Olav Aaen's "Clutch Tuning Handbook," Kenosha, Wis. (1993), which is incorporated herein by reference in its entirety, for a good discussion of "tucking under" and the operation of the cam system. In this embodiment, pins 67 and thus the pivot points of cams 39 are raised in relation to the pins 65 and thus the pivot points of cams 38. This configuration causes the center of gravity of each cam 39 to be closer relatively speaking to the pivot point through pin 67, than the center of gravity of each cam 38 to the pivot point through pin 65. As can be seen in FIG. 12, cam 39 is "tucked under" farther than cam 38. Tucking under cam 39 results in less engagement force at a predetermined engine speed because the cam does not exert as much force with the free end of the cam tucked down in the clutch. This embodiment has the additional desirable effect of lowering the engagement force of the secondary set of cams. This is important because it allows all the preload tuning to be completed essentially with only the primary set of cams exerting centrifugal force against the spring because, although the secondary set of cams are moving with the primary set, the axial force produced by the secondary set in this embodiment is initially negligible compared to the axial force of the primary set. Then when cams 39 have moved out a predetermined amount to contact stop members 63, cams 38 act alone to produce a second displacement rate.

One particular advantage of mounting the rollers and pins on separate "legs" is the additional tuning combinations made possible by moving each set of secondary cams and rollers independent of the primary cams locations. These cam pivot points can be adjusted up or down with the rollers set to provide contact when all six weights are at the initial preload position. Likewise, the cam pivot points can be adjusted inward or outward in relation to the primary cams, while allowing the rollers to also be adjusted to maintain contact with the cams. The cams initially are in contact with the rollers at the initial preload position.

While the invention has been described with reference to the foregoing embodiments, changes and variations may be made thereto which fall within the scope of the appended claims. For example, the embodiments of FIGS. 10–14 could be six column clutches with towers and "buttons" also being associated with the base elements that currently do not extend up into columns by extending those elements up into columns. Similarly, in the embodiments shown in FIGS. 10–13, the "buttons" could be associated with second displacement means 38 instead of first displacement means 39. In addition, in any of the embodiments, three or more sets of displacement means can be used instead of just two as described herein. It has been shown that if cams of the same configuration, profile, size and/or weight are used for the two sets of displacement means that the pivot points can be located at different relative positions for each set to accomplish the invention. Likewise, if cams of different configurations, profiles, size and/or weight are used for the two sets of displacement means then the pivot points can be located at the same relative positions.

Further changes and variations may be made thereto which are within the scope of the appended claims. All such modifications and/or changes are intended to be included within the scope of the claims.

The invention claimed is:

1. A vehicle having a driven clutch connected by an endless belt to a drive clutch assembly mounted on a drive shaft of an engine, said drive clutch assembly comprising:

a center shaft for attaching said drive clutch assembly to the drive shaft;

a fixed sheave attached adjacent one end of said center shaft for common rotation therewith;

a moveable sheave axially slidable along said center shaft relative to a retracted position spaced from said fixed sheave;

speed responsive means for displacing said moveable sheave toward said fixed sheave, said speed responsive means displacing said moveable sheave in an amount and to an extent to control the load transfer to said driven clutch by said moveable sheave and said fixed sheave through said endless belt; and biasing means for urging said moveable sheave toward said retracted position;

said speed responsive means initially applying a first displacement rate as said moveable sheave moves toward said fixed sheave, said speed responsive means applying a second displacement rate when said drive clutch assembly reaches a predetermined rotational speed.

2. The vehicle of claim 1, wherein said first displacement rate is greater than said second displacement rate.

3. The vehicle of claim 1 wherein said speed responsive means automatically applies the second displacement rate when said drive clutch assembly reaches the predetermined rotational speed.

4. The vehicle of claim 1 wherein said speed responsive means comprises:

a first speed responsive means mounted around and spaced from said center shaft; and a second speed responsive means mounted around and spaced from said center shaft;

said first speed responsive means initially working simultaneously with said second speed responsive means to apply said first displacement rate, said first speed responsive means working alone when said drive clutch assembly reaches the predetermined rotational speed to apply said second displacement rate.

5. The vehicle of claim 1 wherein said speed responsive means comprises:

a first flyweight system mounted around and spaced from said center shaft; and a second flyweight system mounted around and spaced from said center shaft;

said first flyweight system initially working simultaneously with said second flyweight system to apply said first displacement rate, said first flyweight system working alone when said drive clutch assembly reaches the predetermined rotational speed to apply said second displacement rate.

6. The vehicle of claim 5, wherein said first flyweight system is equal to or heavier than said second flyweight system.

7. A drive clutch assembly mounted on a drive shaft of an engine, said drive clutch assembly comprising:

a shaft for attaching said drive clutch assembly to the drive shaft;

a fixed sheave attached to one end of said shaft for common rotation therewith;

a moveable sheave axially moveable over said shaft relative to a retracted position spaced from said fixed sheave;

resistance means for urging said moveable sheave toward said retracted position; and displacement means for displacing said moveable sheave toward said fixed sheave, said displacement means displacing said moveable sheave in an amount and to an extent to control the torque transferred by said drive clutch assembly, said displacement means comprises:

first displacement means; and second displacement means;

said first displacement means initially working simultaneously with said second displacement means to apply a first stage displacement rate, said first displacement means automatically working alone when said second displacement means reaches a predetermined position to apply a second stage displacement rate.

8. The drive clutch assembly of claim 7 wherein:

said first displacement means is mounted around and spaced from said shaft;

said second displacement means is mounted around and spaced from said shaft and is spaced from said first displacement means; and said second displacement means is stopped in its movement by a stop member when said second displacement means reaches the predetermined position.

9. The drive clutch assembly of claim 7 wherein:

said first displacement means is a flyweight system;

said second displacement means is a flyweight system; and said first flyweight system is equal to or heavier than said second flyweight system.

10. The drive clutch assembly of claim 7 wherein:

said first displacement means is a pivotally mounted first weight;

said second displacement means is a second weight pivotally mounted coaxially with said first weight; and said second displacement means is stopped from displacing said moveable sheave by a stop member so that said first displacement means applies the second stage displacement rate.

11. An improved drive clutch assembly of the type having a center column for attaching said drive clutch assembly to a motor or engine drive shaft, a sheave affixed on said center column for common rotation therewith, a moveable sheave axially slidable along said center column from a retracted position axially spaced from said sheave, and biasing means for urging said moveable sheave toward said retracted position, the improvement comprising:

speed responsive means for displacing said moveable sheave toward said sheave in accordance with an increase in the speed of the drive shaft;

said speed responsive means initially applying a first displacement rate to move said moveable sheave toward said fixed sheave, said speed responsive means applying a second displacement rate when said drive clutch assembly reaches a predetermined rotational speed.

12. The improved drive clutch assembly of claim 11, wherein said first displacement rate is greater than said second displacement rate.

13. The improved drive clutch assembly of claim 11, wherein said speed responsive means comprises:

a first speed responsive means mounted around and spaced from said center column; and a second speed responsive means mounted around and spaced from said center column;

said first speed responsive means initially working simultaneously with said second speed responsive means to apply said first displacement rate, said first speed responsive means working alone when said drive clutch assembly reaches the predetermined rotational speed to apply said second displacement rate.

14. The improved drive clutch assembly of claim 11, wherein said speed responsive means comprises:

a first flyweight system mounted around and spaced from said center column; and a second flyweight system mounted around and spaced from said center column;

said first flyweight system initially working simultaneously with said second flyweight system to apply said first displacement rate, said first flyweight system working alone when said drive clutch assembly reaches the predetermined rotational speed to apply said second displacement rate.

15. A method for controlling the torque transferred to a driven clutch by a drive clutch assembly of the type having a center column for attaching said drive clutch assembly to a motor or engine drive shaft, a sheave affixed on said center column for common rotation therewith, a moveable sheave axially slidable along said center column from a retracted position and initially axially spaced from said sheave, and displacement means for displacing said moveable sheave toward said sheave, the method comprising:

applying a first displacement rate with said displacement means to said moveable sheave; and applying a second displacement rate with said displacement means automatically when said drive clutch assembly reaches a predetermined rotational speed.

16. The method of claim 15, wherein said first displacement rate is greater than said second displacement rate.

17. The method of claim 15 wherein said first displacement rate is applied by a first displacement means and a second displacement means acting in concert; and said second displacement rate is applied by inhibiting the movement of said second displacement means.

18. The method of claim 15 wherein said first displacement rate is applied by a first flyweight system and a second flyweight system acting together; and said second displacement rate is applied by prohibiting the movement of the second flyweight system with a stop member.

19. The method of claim 18 further comprising:

adjusting said stop member such that said second displacement rate is applied at a predetermined rotational speed of the drive clutch assembly.

* * * * *